(12) United States Patent
Tanaka et al.

(10) Patent No.: US 12,158,362 B2
(45) Date of Patent: Dec. 3, 2024

(54) SENSOR PACKAGE AND METHOD FOR ATTACHING SENSOR PACKAGE

(71) Applicants: NITTO DENKO CORPORATION, Ibaraki (JP); IHI INSPECTION AND INSTRUMENTATION CO., LTD., Tokyo (JP)

(72) Inventors: Akiko Tanaka, Ibaraki (JP); Shigeki Ishiguro, Ibaraki (JP); Yoshiko Kira, Ibaraki (JP); Shintaro Fukumoto, Yokohama (JP); Shun Imagawa, Yokohama (JP); Takayuki Nishido, Yokohama (JP)

(73) Assignees: NITTO DENKO CORPORATION, Ibaraki (JP); IHI INSPECTION AND INSTRUMENTATION CO., LTD., Tokyo (JP)

( * ) Notice: Subject to any disclaimer, the term of this patent is extended or adjusted under 35 U.S.C. 154(b) by 316 days.

(21) Appl. No.: 17/760,906

(22) PCT Filed: Sep. 16, 2020

(86) PCT No.: PCT/JP2020/035044
§ 371 (c)(1),
(2) Date: Mar. 16, 2022

(87) PCT Pub. No.: WO2021/054350
PCT Pub. Date: Mar. 25, 2021

(65) Prior Publication Data
US 2022/0349733 A1  Nov. 3, 2022

(30) Foreign Application Priority Data
Sep. 17, 2019 (JP) .................. 2019-168780

(51) Int. Cl.
*G01D 5/353* (2006.01)
*C09J 5/06* (2006.01)
*C09J 7/38* (2018.01)

(52) U.S. Cl.
CPC ............ *G01D 5/35316* (2013.01); *C09J 5/06* (2013.01); *C09J 7/38* (2018.01)

(58) Field of Classification Search
CPC ....... G01D 11/30; G01D 5/35316; C09J 7/38; C09J 5/06
See application file for complete search history.

(56) References Cited

U.S. PATENT DOCUMENTS

| 7,680,363 B2 * | 3/2010 | Wakahara | G01L 9/0076 385/12 |
| 10,399,286 B2 * | 9/2019 | Jia | G02B 6/02057 |

(Continued)

FOREIGN PATENT DOCUMENTS

| CN | 101675315 A | 3/2010 |
| CN | 102084130 A | 6/2011 |

(Continued)

OTHER PUBLICATIONS

International Search Report issued on Dec. 8, 2020, for corresponding International Patent Application No. PCT/JP2020/035044, along with an English translation.

(Continued)

*Primary Examiner* — Octavia Hollington
(74) *Attorney, Agent, or Firm* — Hauptman Ham, LLP

(57) ABSTRACT

The present invention relates to a sensor package to be attached to an object, and the sensor package includes: a first substrate; an FBG sensor; a resin portion and a first pressure-sensitive adhesive layer positioned on the first substrate; and an adhesive layer positioned on a surface of the resin portion (Continued)

on a side opposite to the first substrate, in which the FBG sensor is held by the resin portion.

20 Claims, 9 Drawing Sheets

(56) References Cited

U.S. PATENT DOCUMENTS

| | | | |
|---|---|---|---|
| 11,274,231 B2* | 3/2022 | Tanaka | C09J 7/30 |
| 2007/0019898 A1 | 1/2007 | Chimenti et al. | |
| 2010/0300209 A1 | 12/2010 | Kreuzer et al. | |
| 2011/0135476 A1 | 6/2011 | Olesen | |
| 2011/0139392 A1 | 6/2011 | Arzberger et al. | |
| 2019/0016925 A1 | 1/2019 | Tanaka et al. | |

FOREIGN PATENT DOCUMENTS

| | | |
|---|---|---|
| CN | 103779370 A | 5/2014 |
| CN | 109029281 A | 12/2018 |
| JP | 2002-90233 A | 3/2002 |
| JP | 2002-311253 A | 10/2002 |
| JP | 2003279760 A * | 10/2003 |
| JP | 2005-134199 A | 5/2005 |
| JP | 2006-208264 A | 8/2006 |
| JP | 2009-503449 A | 1/2009 |
| JP | 2009-300096 A | 12/2009 |
| JP | 2010-519517 A | 6/2010 |
| JP | 2016-194441 A | 11/2016 |
| JP | 6449795 B2 | 12/2018 |
| KR | 10-2018-0083616 A | 7/2018 |
| TW | 201014665 A1 | 4/2010 |
| TW | 201231246 A1 | 8/2012 |
| TW | 201312079 A1 | 3/2013 |

OTHER PUBLICATIONS

Written Opinion issued on Dec. 8, 2020, for corresponding International Patent Application No. PCT/JP2020/035044.

Office Action issued on May 31, 2023 for corresponding Taiwanese Patent Application No. 109132163, along with an English translation (7 pages).

Office Action issued on Jul. 14, 2023 for corresponding Chinese Patent Application No. 202080065103.X, along with an English translation (15 pages).

* cited by examiner

SENSOR PACKAGE AND METHOD FOR ATTACHING SENSOR PACKAGE

CROSS-REFERENCE TO RELATED APPLICATION

The application is a national phase of PCT/JP2020/035044 filed on Sep. 16, 2020, which is based on and claims priority to Japanese Patent Application No. 2019-168780 filed on Sep. 17, 2019, in the Japan Patent Office. All of the aforementioned applications are hereby incorporated by reference in their entireties.

TECHNICAL FIELD

The present invention relates to a sensor package and a method for attaching the sensor package.

BACKGROUND ART

In the related art, a sensor installed on an object to measure a physical change such as vibration and distortion of the object and various kinds of information is used.

For example, Patent Literature 1 discloses a sensor module in which a sensor device is enclosed in a package member and an adhesive sheet is attached to the package member, as one of purposes of reducing variation in output characteristics of a sensor that monitors a state of a structure.

Patent Literature 2 discloses a strain gauge including a slightly adhesive sheet having a slightly adhesive attachable-and-detachable surface on one surface of a base sheet, and a strain gauge element provided on the attachable-and-detachable surface of the slightly adhesive sheet by pattern formation of a strain gauge element material by a photo-etching process.

Patent Literature 3 discloses a curable adhesive sheet that can easily adhere a deformation conversion device and an adherend and can cause the deformation conversion device to accurately detect deformation of the adherend.

CITATION LIST

Patent Literature

Patent Literature 1: JP-A-2016-194441
Patent Literature 2: JP-A-2009-300096
Patent Literature 3: Japanese Patent No. 6449795

SUMMARY OF INVENTION

Technical Problem

In a case where a sensor such as an FBG sensor is attached to a structure, when an adhesive is used, since it takes time for the adhesive to cure, a position where the sensor is attached may shift, and when a pressure-sensitive adhesive is used, sensitivity of the sensor may be greatly reduced. Therefore, there is a demand for a sensor package that can be easily attached without greatly reducing the sensitivity and that is excellent in workability even when a user works in a high place or a place with unstable platform, or when a user works with a glove, or the like.

Further, although an attached sensor device requires high durability that can withstand outdoor use, there is room for consideration in the sensor package in the related art.

In view of the above problems, an object of the present invention is to provide a sensor package that can be easily attached and positioned without greatly reducing sensitivity of an FBG sensor and that is excellent in workability. Another object of the present invention is to provide the sensor package that is applicable to outdoor use and has high durability.

Solution to Problem

As a result of an intensive study, the present inventors conceive that a resin portion holding the FBG sensor and a pressure-sensitive adhesive layer are provided on a substrate, and when the sensor package is attached to an object, the sensor package is temporarily fixed by the adhesive layer. In order to prevent sensitivity of the FBG sensor from being greatly reduced, it is found that it is important to strongly adhere the resin portion holding the FBG sensor to the object with an adhesive layer.

In order to solve the above problems and achieve the object, the present invention has following configurations.

[1]
A sensor package to be attached to an object, the sensor package including:
a first substrate;
an FBG sensor;
a resin portion and a first pressure-sensitive adhesive layer positioned on the first substrate; and
an adhesive layer positioned on a surface of the resin portion on a side opposite to the first substrate, in which
the FBG sensor is held by the resin portion.

[2]
The sensor package according to [1], in which the adhesive layer is cured at room temperature.

[3]
The sensor package according to [1] or [2], in which the adhesive layer is cured by a curing agent.

[4]
The sensor package according to any one of [1] to [3], in which at least a part of an entire periphery of the resin portion holding the FBG sensor excluding a surface on the adhesive layer side is covered with the first pressure-sensitive adhesive layer.

[5]
The sensor package according to any one of [1] to [4], in which
the first pressure-sensitive adhesive layer has an opening portion that penetrates in a thickness direction, and
the resin portion holds the FBG sensor so as to fill a gap between the FBG sensor disposed in the opening portion and the opening portion.

[6]
The sensor package according to any one of [1] to [5], in which surfaces of the first pressure-sensitive adhesive layer and the adhesive layer on a side to be attached to the object are protected by a first release liner.

[7]
The sensor package according to any one of [1] to [6], in which the first substrate is transparent or translucent.

[8]
The sensor package according to any one of [1] to [7], further including: a second pressure-sensitive adhesive layer and a second substrate in this order on a surface of the first substrate on a side opposite to a surface on the first pressure-sensitive adhesive layer side.

[9]
The sensor package according to [8], in which the second substrate is a weather resistant substrate.

[10]

The sensor package according to [8] or [9], further including:

a second release liner in a part between the first substrate and the second pressure-sensitive adhesive layer, in which the second release liner includes an extension portion that extends beyond the second pressure-sensitive adhesive layer and is exposed in a surface spreading direction of the second release liner.

[11]

A method for attaching the sensor package according to any one of [1] to [10], in which the adhesive layer in the sensor package is cured by the curing agent, the method for attaching the sensor package including:

a step of applying the curing agent to at least one of the adhesive layer and the object; and a step of attaching the sensor package to the object via the adhesive layer.

[12]

A method for attaching the sensor package according to any one of [1] to [10], in which the adhesive layer in the sensor package is cured by the curing agent, the method for attaching the sensor package including:

a step of applying the curing agent to the adhesive layer;

a step of applying the curing agent to the object; and a step of attaching the sensor package to the object so that the curing agent applied to the adhesive layer and the curing agent applied to the object are in contact with each other.

[13]

A method for attaching the sensor package according to any one of [1] to [3] in which the sensor package is attached to the object, in which in the sensor package, surfaces of the first pressure-sensitive adhesive layer and the adhesive layer on a side to be attached to the object are protected by a first release liner, the sensor package includes the first substrate, a second pressure-sensitive adhesive layer and a second substrate in this order on a surface of the first pressure-sensitive adhesive layer on a side opposite to a surface on the side to be attached to the object, and the sensor package includes a second release liner in a part between the first substrate and the second pressure-sensitive adhesive layer, and the second release liner includes an extension portion that extends beyond the second pressure-sensitive adhesive layer and is exposed in a surface spreading direction of the second release liner, the method for attaching the sensor package including:

a step of releasing the first release liner and applying a curing agent to the adhesive layer;

a step of attaching a release surface from which the first release liner of the sensor package is released to the object; and a step of releasing the second release liner and attaching a release surface of the second pressure-sensitive adhesive layer, from which the second release liner is released, to the first substrate.

[14]

A set including:

the sensor package and the curing agent according to any one of [1] to [10].

Advantageous Effects of Invention

The sensor package according to one aspect of the present invention can be easily attached and positioned without greatly reducing sensitivity of the FBG sensor, and is excellent in workability. In addition, the sensor package is applicable to outdoor use and has high durability.

DESCRIPTION OF EMBODIMENTS

Figure 1:
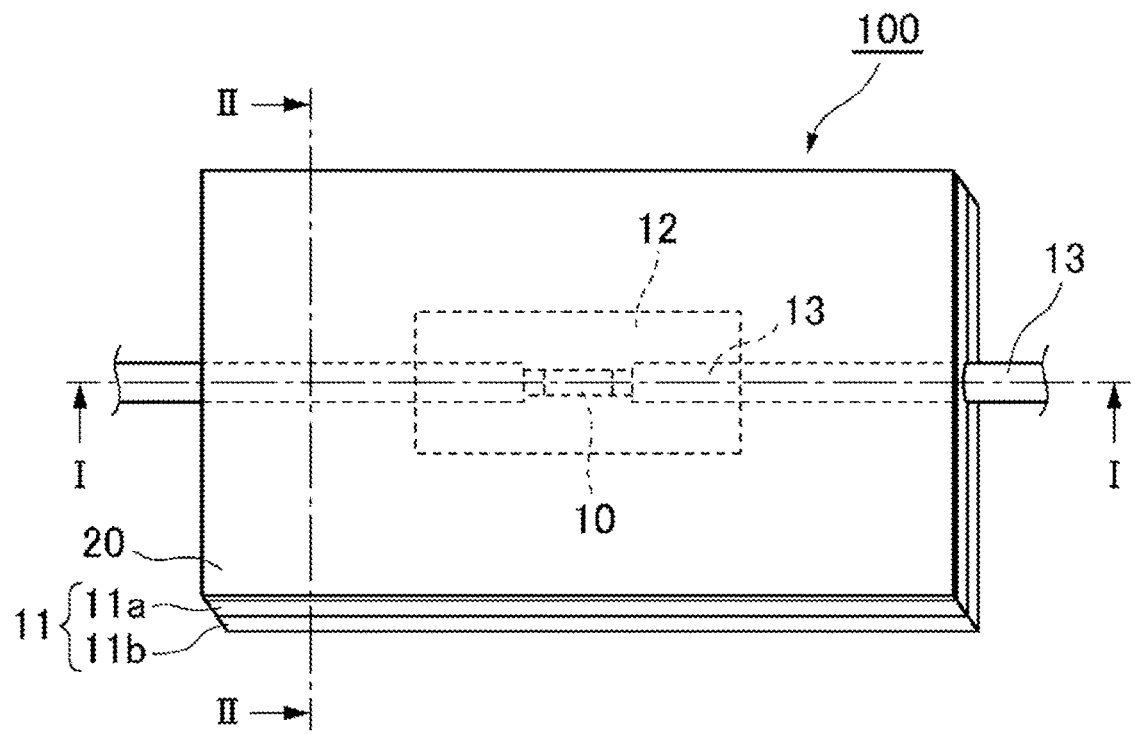
FIG. 1 is a schematic view of a configuration example of a sensor package.

Hereinafter, embodiments of the present invention will be described in detail.

In the drawings, members and portions having the same functions may be denoted by the same reference signs, and duplicate description may be omitted or simplified. The embodiments described in the drawings are schematically for the purpose of clearly explaining the present invention, and do not necessarily accurately represent a size or scale of an actual product.

[Sensor Package]

The sensor package according to an embodiment of the present invention is a sensor package to be attached to an object, and includes: a first substrate; an FBG sensor; a resin portion and a first pressure-sensitive adhesive layer positioned on the first substrate; and an adhesive layer positioned on a surface of the resin portion on a side opposite to the first substrate, in which the FBG sensor is held by the resin portion.

First Embodiment

Figure 2:
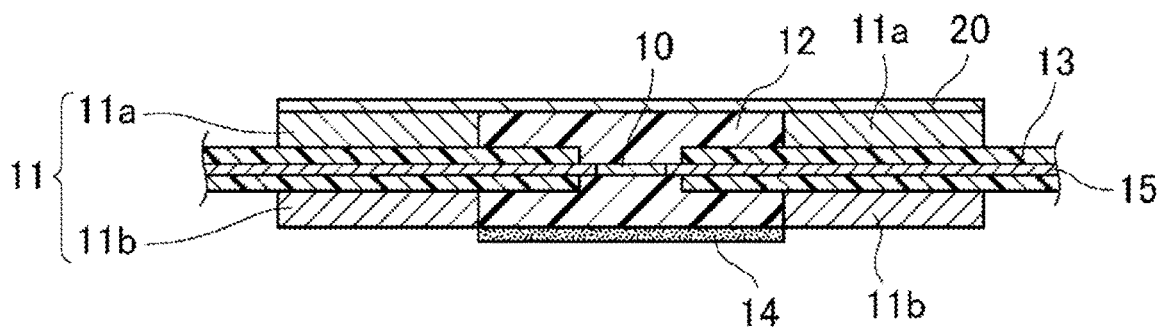
FIG. 2 is a schematic cross-sectional view taken along a line I-I in FIG. 1.
Figure 3:
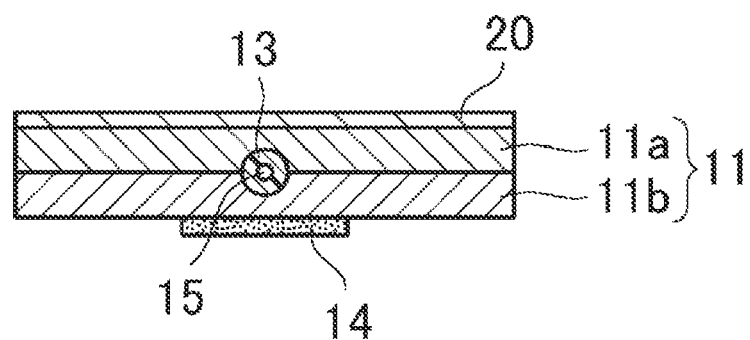
FIG. 3 is a schematic cross-sectional view taken along a line II-II in FIG. 1.

FIG. 1 is a schematic view of a sensor package 100 according to the first embodiment of the present invention. FIG. 2 is a schematic cross-sectional view taken along a line I-I in FIG. 1. FIG. 3 is a schematic cross-sectional view taken along a line II-II in FIG. 1.

The sensor package 100 shown in FIGS. 1 to 3 includes: a first substrate 20; a Fiber Bragg Grating (FBG) sensor 10 attached to an object; a resin portion 12 and a first pressure-sensitive adhesive layer 11 positioned on the first substrate 20; and an adhesive layer 14 positioned on a surface of the resin portion 12 on a side opposite to the first substrate 20, in which the FBG sensor 10 is held by the resin portion 12.

In the sensor package 100, at least a part of an entire periphery of the resin portion 12 holding the FBG sensor 10 excluding a surface on an adhesive layer side may be covered with the first pressure-sensitive adhesive layer 11. In the sensor package 100 shown in FIGS. 1 to 3, a surface on a side on which the adhesive layer 14 is provided is a surface on a side to be attached to the object.

The FBG sensor 10 is formed by engraving a periodic diffraction grating on a core of an optical fiber 15, and a detection signal of the FBG sensor 10 is output to an outside of the sensor package 100. The optical fiber 15 may be covered with a covering material 13.

A material of the covering material 13 is not particularly limited, and examples thereof include a gold coated metal material, and a resin material such as polyimide, silicone, nylon, acrylic, and vinyl chloride. The covering material 13 may be a resin coating material for coating the optical fiber 15 with a resin, or may be a sheath material or the like. The covering material 13 may be a single layer or a plurality of layers.

The first pressure-sensitive adhesive layer 11 is provided on the first substrate. By providing the first pressure-sensitive adhesive layer 11, when the sensor package is installed on the object, the sensor package can be temporarily fixed by the first pressure-sensitive adhesive layer 11 and strongly adhered by curing of the adhesive layer, and is excellent in workability. In addition, since a gap between the sensor package 100 and the object is filled by the first pressure-sensitive adhesive layer 11 and durability is excellent, outside air and moisture can be prevented from entering the FBG sensor 10.

It is preferable that the first pressure-sensitive adhesive layer covers at least a part of the entire periphery of the resin portion holding the FBG sensor excluding a surface on the side to be attached to the object. This is because, in a case where the FBG sensor detects information from the object, when a pressure-sensitive adhesive layer is present between the FBG sensor and the object, obtained deformation is mitigated by the pressure-sensitive adhesive layer, so that sensitivity of detection is greatly reduced.

Figure 4:
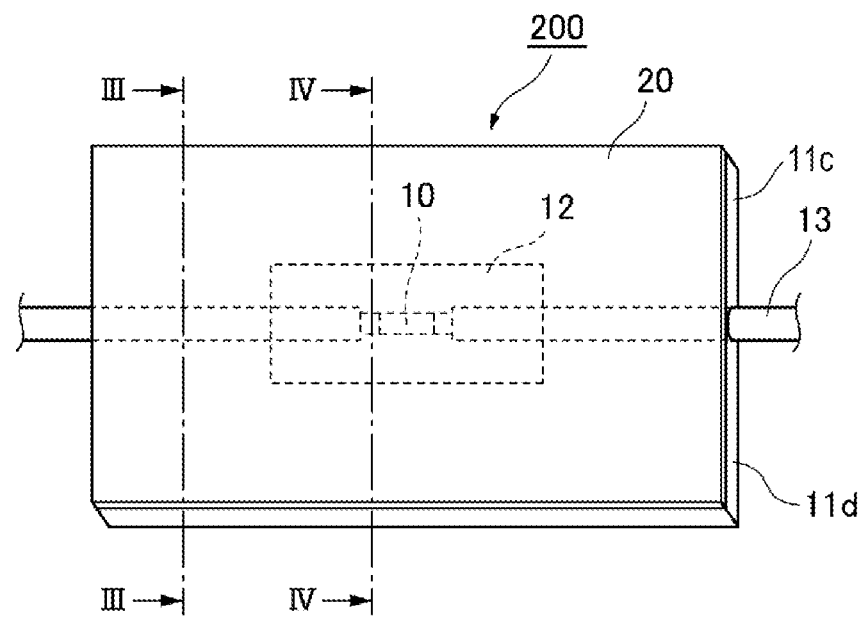
FIG. 4 is a schematic view of a configuration example of the sensor package.
Figure 5:
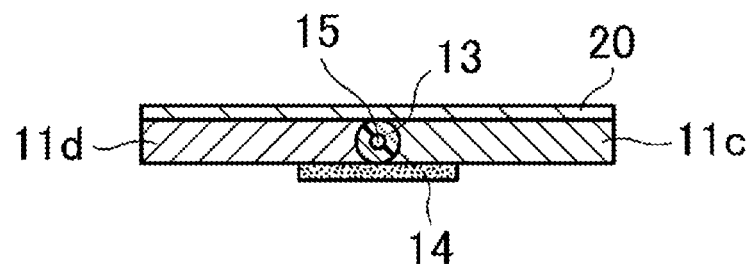
FIG. 5 is a schematic cross-sectional view taken along a line in FIG. 4.
Figure 6:
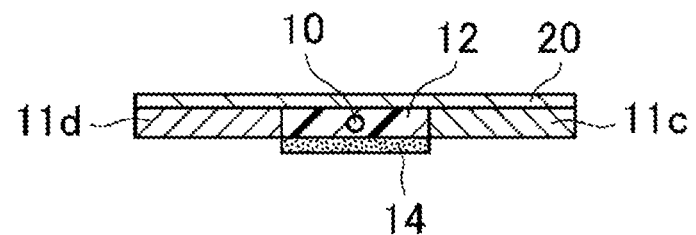
FIG. 6 is a schematic cross-sectional view taken along a line IV-IV in FIG. 4.

The first pressure-sensitive adhesive layer 11 may be formed of a plurality of pressure-sensitive adhesive layers. For example, as shown in FIGS. 1 to 3, a first pressure-sensitive adhesive layer 11a and a first pressure-sensitive adhesive layer 11b may be stacked, and as shown in FIGS. 4 to 6, a first pressure-sensitive adhesive layer 11c and a first pressure-sensitive adhesive layer 11d may be combined. Thicknesses of the first pressure-sensitive adhesive layer 11a and the first pressure-sensitive adhesive layer 11b may be the same or different, and when the thicknesses are different, either thickness may be larger.

When the covering material 13 is provided on the optical fiber 15, the first pressure-sensitive adhesive layer 11a and the first pressure-sensitive adhesive layer 11b can be provided with notches at positions corresponding to the covering material 13 depending on a thickness of the covering material 13. By providing the notch, the sensor package can be attached to the object with almost no gap between the first pressure-sensitive adhesive layer 11 and the object, the outside air and moisture can be prevented from entering the FBG sensor 10, and the sensor package has excellent durability.

When a maximum diameter of the covering material 13 (an outer diameter of the covering material 13 including the optical fiber 15) is smaller than a thickness of the first pressure-sensitive adhesive layer 11, it is not always necessary to provide the notch in the first pressure-sensitive adhesive layer 11, and the covering material 13 is embedded in the first pressure-sensitive adhesive layer 11, which can prevent the outside air and moisture from entering and has excellent durability.

When the covering material 13 is provided on the optical fiber 15, the thickness of the first pressure-sensitive adhesive layer 11 is preferably equal to or larger than the maximum diameter (outer diameter) of the covering material 13.

An outer diameter of the optical fiber is preferably 0.125 mm.

The thickness of the covering material 13 that covers the optical fiber 15 is not particularly limited, and is usually 10 μm to 1 mm.

For example, the optical fiber having the outer diameter of 0.125 mm may be covered with a resin covering material, so that an outer diameter of the covering material including the optical fiber may be preferably 0.15 mm to 1 mm.

The first pressure-sensitive adhesive layer 11 may have an opening portion that penetrates in a thickness direction (hereinafter, may be simply referred to as an opening portion).

When the FBG sensor is disposed in the opening portion and a gap between the FBG sensor and the opening portion is filled with the resin portion, the FBG sensor and the first pressure-sensitive adhesive layer are not in contact with each other, and accurate information of the object is more easily obtained. Further, by disposing the FBG sensor in the opening portion, a position of the FBG sensor can be visually confirmed, and positioning at the time of performing attachment work is facilitated.

A shape of the opening portion is not particularly limited, and may be circular, elliptical, polygonal, square, or rectangular.

The resin portion 12 is positioned on the first substrate and holds the FBG sensor 10.

The FBG sensor 10 is preferably protected by the resin portion 12 so as not to be exposed to the outside air, may be embedded in the resin portion 12, and a portion of the FBG sensor 10 may be exposed from the resin portion 12, but it is preferable that an entire periphery of the FBG sensor 10 excluding wiring of the FBG sensor 10 is embedded in the resin portion 12. When the entire periphery of the FBG sensor 10 excluding the wiring of the FBG sensor 10 is embedded in the resin portion 12, the FBG sensor 10 detects the information of the object via the resin portion 12.

At least the part of the entire periphery of the resin portion 12 excluding the surface on the side to be attached to the object may be covered with the first pressure-sensitive adhesive layer 11.

When the first pressure-sensitive adhesive layer 11 has the opening portion that penetrates in the thickness direction, the resin portion 12 is provided to fill the gap between the FBG sensor 10 disposed in the opening portion and the opening portion, and can hold the FBG sensor 10.

In order to increase the sensitivity of detection by the FBG sensor 10, it is preferable that the resin portion 12 is formed such that the surface of the resin portion 12 on the side opposite to the first substrate and a surface (attachment surface) of the first pressure-sensitive adhesive layer 11 on a side opposite to the first substrate are flush with each other.

The resin portion 12 and the first pressure-sensitive adhesive layer 11 are positioned on the first substrate 20, and the sensor package 100 includes the adhesive layer 14 positioned on the surface of the resin portion 12 on the side opposite to the first substrate 20. As shown in FIGS. 1 to 3, the adhesive layer 14 can be installed such that when the sensor package 100 is attached to the object, the resin portion 12 is attached to the object via the adhesive layer 14. Accordingly, the FBG sensor 10 held by the resin portion 12 is attached to the object via the resin portion 12 and the adhesive layer 14. That is, the FBG sensor 10 detects the information of the object through the resin portion 12 and the adhesive layer 14 without passing through the first pressure-sensitive adhesive layer 11, which can prevent the sensitivity from being greatly reduced.

Second Embodiment

In the second embodiment, a similar member as that in the above embodiment is denoted by the same reference sign, and a detailed description thereof is omitted.

FIG. 4 is a schematic view of a sensor package 200 according to the second embodiment of the present invention. FIG. 5 is a schematic cross-sectional view taken along a line in FIG. 4. FIG. 6 is a schematic cross-sectional view taken along a line IV-IV in FIG. 4.

The sensor package 200 shown in FIG. 4 is a modification of the sensor package 100 shown in FIG. 1, and shows an embodiment in which the thickness of the first pressure-sensitive adhesive layer 11 in FIG. 1 is about the same as the maximum diameter (thickness) of the covering material 13. The thickness of the first pressure-sensitive adhesive layer 11 may be larger than the maximum diameter of the covering material 13.

As shown in FIGS. 4 to 6, in the sensor package 200, the first pressure-sensitive adhesive layer 11c and the first pressure-sensitive adhesive layer 11d having a shape obtained by cutting the first pressure-sensitive adhesive layer 11 at a position corresponding to the covering material 13 are abutted against the covering material 13, so that the FBG sensor 10 can be disposed in the opening portion of the first pressure-sensitive adhesive layer 11 and held by the resin portion 12.

Thicknesses of the first pressure-sensitive adhesive layer 11c and the first pressure-sensitive adhesive layer 11d may be the same or different, but are preferably the same.

In addition to the first pressure-sensitive adhesive layer 11c and the first pressure-sensitive adhesive layer 11d, the first pressure-sensitive adhesive layer 11a in FIG. 1 may be further combined to form the first pressure-sensitive adhesive layer 11.

Third Embodiment

In the third embodiment, a similar member as that in the above embodiments is denoted by the same reference sign, and a detailed description thereof is omitted.

Figure 7:
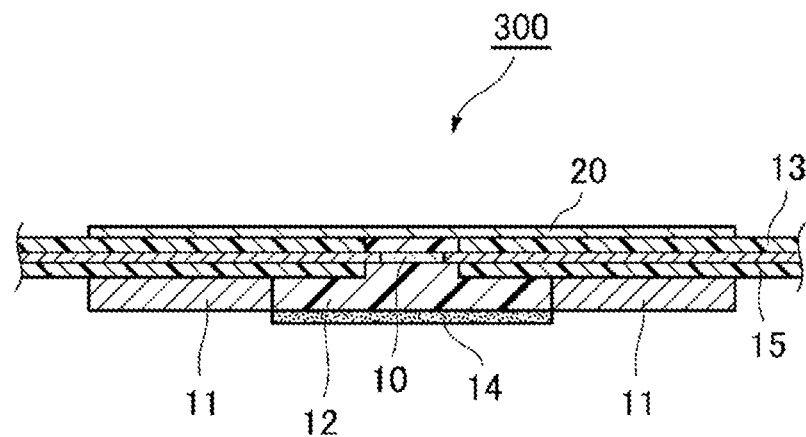
FIG. 7 is a schematic cross-sectional view of a configuration example of the sensor package.

FIG. 7 is a schematic cross-sectional view of a sensor package 300 according to the third embodiment of the present invention.

The sensor package 300 shown in FIG. 7 is a modification of the sensor package 100 shown in FIG. 1, and is an embodiment in which the first pressure-sensitive adhesive layer 11 in FIG. 1 is one layer.

The FBG sensor 10 in the sensor package 300 is formed in the optical fiber 15, and the optical fiber 15 includes the covering material 13. As shown in FIG. 7, the optical fiber 15 with the FBG sensor 10 in the sensor package 300 may be disposed such that the covering material 13 is in contact with the first substrate 20.

Fourth Embodiment

Figure 8:
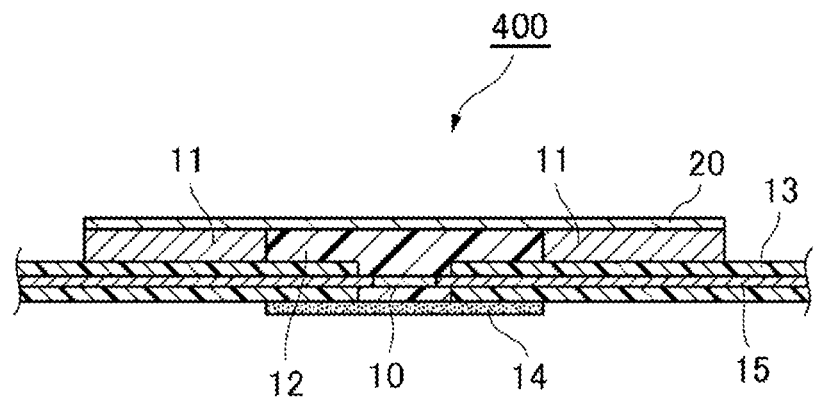
FIG. 8 is a schematic cross-sectional view of a configuration example of the sensor package.

In the fourth embodiment, a similar member as that in the above embodiments is denoted by the same reference sign, and a detailed description thereof is omitted. FIG. 8 is a schematic cross-sectional view of a sensor package 400 according to the fourth embodiment of the present invention.

The sensor package 400 shown in FIG. 8 is a modification of the sensor package 100 shown in FIG. 1, and is an embodiment in which the first pressure-sensitive adhesive layer 11 in FIG. 1 is one layer.

The FBG sensor 10 in the sensor package 400 is formed in the optical fiber 15, and the optical fiber 15 includes the covering material 13. As shown in FIG. 8, the optical fiber 15 with the FBG sensor 10 in the sensor package 400 may be disposed such that the covering material 13 is in contact with the adhesive layer 14.

Fifth Embodiment

In the fifth embodiment, a similar member as that in the above embodiments is denoted by the same reference sign, and a detailed description thereof is omitted.

Figure 9:
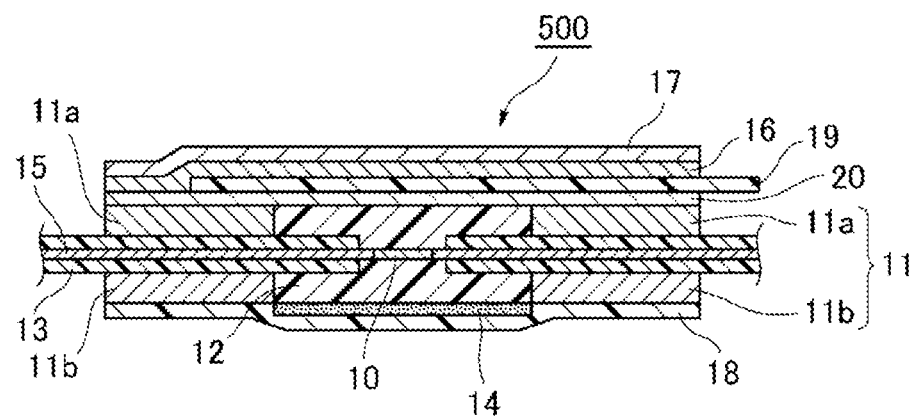
FIG. 9 is a schematic cross-sectional view of a configuration example of the sensor package.

FIG. 9 is a schematic cross-sectional view of a configuration example of a sensor package according to the fifth embodiment of the present invention.

As shown in FIG. 9, a sensor package 500 may include a second pressure-sensitive adhesive layer 16 and a second substrate 17 in this order on a surface of the first substrate 20 on a side opposite to a surface on a first pressure-sensitive adhesive layer 11 side.

In addition, the sensor package 500 may include a second release liner 19 in a part between the first substrate 20 and the second pressure-sensitive adhesive layer 16. By providing the second release liner 19 in the part between the first substrate 20 and the second pressure-sensitive adhesive layer 16, the second substrate 17 can be stacked on the first substrate 20 at any timing. When the second release liner 19 is released and the second substrate 17 is stacked on the first substrate 20 after the sensor package 500 is attached to the object, the FBG sensor 10 is easily visible, positioning is facilitated, and workability is excellent at the time of attachment.

The second release liner 19 may be provided with a back split portion. The back split portion is formed by making a cutting line on a surface of the second release liner 19 on a side opposite to a contact surface with the pressure-sensitive adhesive layer. A shape of the cutting line may be linear, curved, for example, wavy, or a combination thereof. In addition, the cutting line may be a solid line, a broken line, or a combination thereof. The second release liner 19 can be easily removed by providing the back split portion on the second release liner 19.

In addition, the sensor package 500 may include the second release liner 19 in the part between the first substrate 20 and the second pressure-sensitive adhesive layer 16, and the second release liner 19 may include an extension portion that extends beyond the second pressure-sensitive adhesive layer 16 and is exposed in a surface spreading direction of the second release liner 19. If the second release liner 19 has the extension portion, the extension portion serves as a grip portion, and the sensor package having excellent workability can be obtained. A shape of the extension portion is not particularly limited, and any appropriate shape may be adopted depending on a purpose. Specific examples of a visual shape of the extension portion include a quadrangle (including a trapezoid) and a semi-elliptical shape. An end portion of the extension portion may be a waveform or the like. A length of the extension portion in a releasing direction is preferably from 1 mm to 30 mm, and more preferably from 5 mm to 20 mm. When the length of the extension portion in the releasing direction falls within such a range, the sensor package having excellent releasing operability and good workability can be obtained.

Next, a method for manufacturing the sensor package according to the embodiment of the present invention will be described.

[Method for Manufacturing Sensor Package]

The method for manufacturing the sensor package according to the embodiment of the present invention includes a step of providing the first pressure-sensitive adhesive layer 11 on the first substrate 20, a step of providing the FBG sensor 10 embedded by the resin portion 12, and a step of providing the adhesive layer 14 positioned on the surface of the resin portion 12 on the side opposite to the first substrate 20.

In the step of providing the first pressure-sensitive adhesive layer 11, the first pressure-sensitive adhesive layer 11 may be directly formed on the first substrate by applying and curing of an adhesive composition, or the pressure-sensitive adhesive layer formed in advance may be attached. When the first pressure-sensitive adhesive layer 11 is formed of a plurality of pressure-sensitive adhesive layers, the step of providing the first pressure-sensitive adhesive layer 11 may be performed in a plurality of times.

For example, in the case of the sensor package 100 shown in FIGS. 1 to 3, the first pressure-sensitive adhesive layer 11a may be disposed on the first substrate, then the FBG sensor 10 may be disposed, and the first pressure-sensitive adhesive layer 11b may be disposed.

As shown in FIGS. 1 to 3, the FBG sensor 10 can be in the opening portion of the first pressure-sensitive adhesive layer 11.

The optical fiber 15 with the FBG sensor 10 may be covered with the covering material 13. When the optical fiber 15 with the FBG sensor 10 is covered with the covering material 13, at least one of the first pressure-sensitive adhesive layer 11a and the first pressure-sensitive adhesive layer 11b may be provided with notches at positions corresponding to the optical fiber 15 and the covering material 13.

For example, as shown in FIGS. 4 to 6, the first pressure-sensitive adhesive layer 11 may be formed by combining the first pressure-sensitive adhesive layer 11c and the first pressure-sensitive adhesive layer 11d. When the optical fiber 15 with the FBG sensor 10 is covered with the covering material 13, at least one of the first pressure-sensitive adhesive layer 11c and the first pressure-sensitive adhesive layer 11d may be provided with notches at positions corresponding to the optical fiber 15 and the covering material 13.

As shown in FIG. 7, in the sensor package 300, after the FBG sensor 10 is installed on the first substrate 20, the first pressure-sensitive adhesive layer 11 and the resin portion may be provided. In the sensor package 400 as shown in FIG. 8, after the first pressure-sensitive adhesive layer 11 is provided on the first substrate 20, the FBG sensor 10 may be installed, and then the resin portion may be provided.

When the optical fiber 15 with the FBG sensor 10 is covered with the covering material 13, the first pressure-sensitive adhesive layer 11 may be provided with notches at positions corresponding to the covering material 13.

When the maximum diameter of the covering material 13 is smaller than the thickness of the first pressure-sensitive adhesive layer 11, it is not always necessary to provide the notch in the first pressure-sensitive adhesive layer 11, and the covering material 13 is embedded in the first pressure-sensitive adhesive layer 11, which can prevent the outside air and moisture from entering and has excellent durability.

In the step of providing the FBG sensor 10 embedded by the resin portion 12, the FBG sensor 10 may be embedded in the resin portion 12 after the FBG sensor 10 is installed on the first substrate, or the FBG sensor 10 embedded in the resin portion 12 in advance may be installed on the first substrate.

When the first pressure-sensitive adhesive layer 11 has the opening portion, the FBG sensor 10 can be in the opening portion of the first pressure-sensitive adhesive layer 11 as shown in FIGS. 1 to 3. Then, a resin composition for forming the resin portion 12 is filled in the opening portion, so that the resin portion 12 can fill the gap between the FBG sensor disposed in the opening portion and the opening portion. Accordingly, the FBG sensor is embedded and held by the resin portion 12. The FBG sensor 10 embedded in the resin portion 12 in advance may be placed on the first substrate 20, and at least the part of the entire periphery of the resin portion 12 excluding the surface on the side to be attached to the object may be covered with the first pressure-sensitive adhesive layer 11.

In addition, the step of providing the first pressure-sensitive adhesive layer 11 on the first substrate 20 and the step of providing the FBG sensor 10 embedded in the resin portion 12 can be performed at the same time.

For example, the first pressure-sensitive adhesive layer 11b is disposed on any release liner 30, the FBG sensor 10 is placed to be positioned in the opening portion of the first pressure-sensitive adhesive layer 11b, further, the first pressure-sensitive adhesive layer 11a is disposed to face the first pressure-sensitive adhesive layer 11b, a resin fills opening portions of the first pressure-sensitive adhesive layer 11a and the first pressure-sensitive adhesive layer 11b and cures to form the resin portion 12, and the FBG sensor 10 is embedded in the resin portion 12.

Then, the first substrate 20 is stacked on a first pressure-sensitive adhesive layer 11a side on a side opposite to a first pressure-sensitive adhesive layer 11b side, and the release liner 30 is released, so that the first pressure-sensitive adhesive layer 11 and the FBG sensor 10 embedded in the resin portion 12 can be provided on the first substrate 20 at the same time.

Then, by the step of providing the adhesive layer 14, the adhesive layer 14 can be provided on the surface of the resin portion 12 on the side opposite to the first substrate 20. The adhesive layer 14 may be directly formed on the resin portion 12 by applying and curing of an adhesive composition, or the adhesive layer 14 formed in advance may be attached to the resin member 12.

The step of providing the adhesive layer 14 can be performed after the FBG sensor 10 is embedded in the resin portion 12, may be performed after the resin portion 12 is disposed on the first substrate 20, or may be performed before the resin portion 12 is disposed on the first substrate 20.

As shown in FIG. 9, surfaces of the first pressure-sensitive adhesive layer and the adhesive layer on the side to be attached to the object may be protected by a first release liner, or the first release liner may be attached.

The sensor package 500 may include the second pressure-sensitive adhesive layer 16 and the second substrate 17 in this order on the surface of the first substrate 20 on the side opposite to the surface on the first pressure-sensitive adhesive layer 11 side.

In addition, the sensor package 500 may include the second release liner 19 in the part between the first substrate 20 and the second pressure-sensitive adhesive layer 16.

The second release liner 19 can be stacked on a part of a surface of the first substrate 20 on the side opposite to the surface on the first pressure-sensitive adhesive layer 11 side, and the second pressure-sensitive adhesive layer 16 and the second substrate 17 can be provided on the first substrate 20 and the second release liner. The second pressure-sensitive adhesive layer 16 and the second substrate 17 may be formed by applying and curing of a material for forming the second pressure-sensitive adhesive layer 16 or the second substrate 17, or the second pressure-sensitive adhesive layer 16 and the second substrate 17 formed in advance may be attached.

The second substrate may be a weather resistant substrate.

[Method for Attaching Sensor Package]

Next, the method for attaching the sensor package of the present embodiment will be described.

The method for attaching the sensor package according to the present embodiment includes a step of attaching the sensor package to the object. The object and the FBG sensor held by the resin portion are adhered to each other by the adhesive layer and the first pressure-sensitive adhesive layer before the adhesive layer is cured, and the object and the FBG sensor held by the resin portion are strongly adhered by curing of the adhesive layer, and the sensitivity of the FBG sensor can be prevented from being greatly reduced.

When the adhesive layer in the sensor package is cured by a curing agent, a step of bringing the adhesive layer into contact with the curing agent is necessary. The adhesive layer reacts with the curing agent by being in contact with the curing agent. The step of bringing the adhesive layer into contact with the curing agent may include a step of applying the curing agent to at least one of the adhesive layer and the object, and a step of attaching the sensor package to the object via the adhesive layer.

For example, the step of bringing the adhesive layer into contact with the curing agent may include a step of applying the curing agent to the adhesive layer and a step of attaching the sensor package to the object, and may include a step of applying the curing agent to the object and a step of attaching the sensor package to the object so that the adhesive layer and the applied curing agent are in contact with each other.

In addition, the step of bringing the adhesive layer into contact with the curing agent may include the step of applying the curing agent to the adhesive layer, the step of applying the curing agent to the object, and a step of attaching the sensor package to the object so that the curing agent applied to the adhesive layer and the curing agent applied to the object are in contact with each other.

In addition, if necessary, the adhesive layer and the curing agent may be heated, and a heating temperature is, for example, preferably 50° C. or more, and more preferably 70° C. or more, and for example, preferably 130° C. or less, and more preferably 110° C. or less.

A reaction temperature is preferably a room temperature. The room temperature is a temperature at which the above heating (for example, heating of 50° C. or more) for reacting the adhesive layer with the curing agent is not performed, and is for example, less than 50° C., and preferably 40° C. or less, and is, for example, 10° C. or more, and preferably 20° C. or more.

When the reaction temperature is the room temperature, heating for reacting the adhesive layer with the curing agent is not required, and the sensor package can be adhered to the object more easily, and the workability is excellent.

A reaction time is, for example, 1 hour or more, and preferably 12 hours or more, and for example, 96 hours or less, and preferably 48 hours or less.

Accordingly, the adhesive layer is cured to form a cured layer. Preferably, the adhesive layer is cured at room temperature.

The object and the FBG sensor held by the resin portion are strongly adhered by the cured layer, and the sensitivity of the FBG sensor can be prevented from being greatly reduced.

A shear adhesion strength of the cured layer is, for example, 0.1 MPa or more, preferably 0.4 MPa or more, more preferably 0.6 MPa or more, even more preferably 0.7 MPa or more, particularly preferably 1.0 MPa or more, most preferably 2.3 MPa or more, even more preferably 2.5 MPa or more, and still more preferably 3.5 MPa or more.

When the shear adhesion strength of the cured layer is a lower limit or more described above, the adhesive layer has excellent adhesiveness and can reliably adhere the object and the FBG sensor held by the resin portion.

The shear adhesion strength of the cured layer is measured by a following method. That is, the adhesive layer is sandwiched between two released polyethylene terephthalate films, one polyethylene terephthalate film is released from the adhesive layer, the released adhesive layer is disposed on a first slate plate, and then the other polyethylene terephthalate film is released from the adhesive layer. Separately, the curing agent is disposed on a second slate plate. Then, the adhesive layer and the curing agent are brought into contact with each other so as to be sandwiched between the first slate plate and the second slate plate, and allowed to stand for 24 hours to form the cured layer. After that, the first slate plate and the second slate plate are pulled in a shearing direction at a speed of 5 mm/min, and a strength when the two slate plates are released is determined as the shear adhesion strength.

In the method for attaching the sensor package according to another embodiment, the surfaces of the first pressure-sensitive adhesive layer and the adhesive layer on the side to be attached to the object are protected by the first release liner, the sensor package includes the first substrate, the second pressure-sensitive adhesive layer, and the second substrate in this order on a surface of the first pressure-sensitive adhesive layer on a side opposite to the surface on the side to be attached to object, the sensor package includes the second release liner in the part between the first substrate and the second pressure-sensitive adhesive layer, and the second release liner includes the extension portion that extends beyond the second pressure-sensitive adhesive layer and is exposed in the surface spreading direction of the second release liner, and the method for attaching the sensor package includes: a step of releasing the first release liner and bringing the curing agent into contact with the adhesive layer; a step of attaching a release surface from which the first release liner of the sensor package is released to the object; and a step of releasing the second release liner and attaching a release surface of the second pressure-sensitive adhesive layer, from which the second release liner is released, to the first substrate.

The step of bringing the adhesive layer into contact with the curing agent is the similar as described above.

As shown in FIG. 9, since the sensor package includes the second release liner in a part between the first substrate and the second pressure-sensitive adhesive layer, the FBG sensor held by the resin portion can be visually observed when the release surface from which the first release liner is released is attached to the object. Therefore, positioning when the FBG sensor is attached to the object is facilitated, and the workability is excellent.

Figure 10:
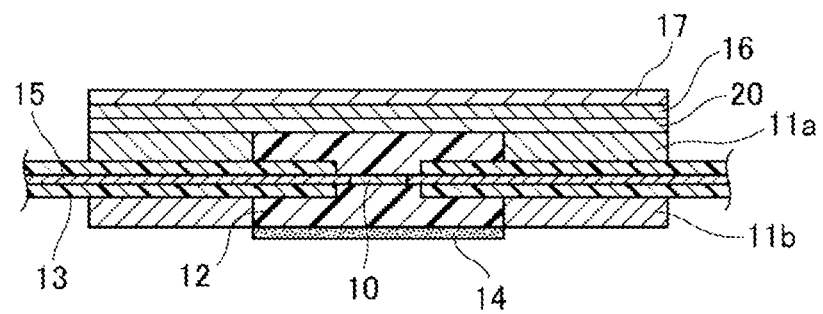
FIG. 10 is a schematic cross-sectional view of a configuration example of the sensor package.

Next, the second release liner is released, and with a step of attaching the release surface of the second pressure-sensitive adhesive layer from which the second release liner is released to the first substrate, as shown in FIG. 10, the second pressure-sensitive adhesive layer and the second substrate are stacked in this order on the surface of the first substrate on a side opposite to the resin portion. Accordingly, the first pressure-sensitive adhesive layer, the FBG sensor, the resin portion, and the first substrate are protected by the second pressure-sensitive adhesive layer and the second substrate, so that weather resistance of the sensor package is improved.

[Set Including Sensor Package and Curing Agent]

The sensor package according to the embodiment of the present invention can be set together with the curing agent. That is, the set according to the embodiment of the present invention includes the sensor package and the curing agent according to the embodiment of the present invention.

The sensor package and the curing agent in the set according to the embodiment of the present invention are synonymous with the above-mentioned sensor package and the curing agent, and are similar as those preferred.

According to the set according to the embodiment of the present invention, the sensor package and the object can be easily and strongly adhered to each other, the workability is excellent, and the sensitivity of the FBG sensor can be prevented from being greatly reduced.

Next, a material and the like forming the sensor package according to the embodiment of the present invention will be described.

[First Substrate]

As the first substrate, various substrates can be preferably used. As the first substrate, for example, a resin film, paper, cloth, a rubber film, a foam film, a metal foil, a composite or a stacked structure thereof, or the like can be used. Among these, a film substrate including a resin film is preferable from a viewpoint of attachment property and appearance. The film substrate including the resin film is also advantageous in terms of dimensional stability, thickness accuracy, workability, tensile strength, and the like. Examples of resin films include a polyolefin-based resin film such as PE, PP, and ethylene-propylene copolymer; a polyester-based resin film such as PET, polybutylene terephthalate, and polyethylene naphthalate; a vinyl chloride-based resin film; a vinyl acetate-based resin film; a polyimide-based resin film; a polyamide-based resin film; a fluorine-based resin film; cellophane; and the like. Preferable examples include the resin film formed of the PE, PP, or PET.

Among the resin films, a polyester film is more preferable, and in the polyester film, a PET film is even more preferable. The film substrate may have a single-layer structure or a multilayer structure of two or three or more layers.

The first substrate is preferably transparent or translucent.

In order to accurately obtain the information of the object, an attachment position of the FBG sensor is important when the sensor package is attached to the object. Since the first substrate is transparent or translucent, the position of the FBG sensor in the sensor package can be grasped. Therefore, positioning when attaching the FBG sensor to the object is easy and the workability is excellent.

Specifically, the first substrate preferably exhibits a total light transmittance of 80% or more (for example, 90% or more, typically 95% or more). A haze value of the first substrate is preferably 10% or less (for example, 5% or less).

A thickness of the first substrate is preferably 5 μm or more, and more preferably 10 μm or more, from a viewpoint of ensuring a strength for the first substrate to function as a support in the sensor package. From a viewpoint of implementing appropriate flexibility in the sensor package, the thickness of the first substrate is preferably 300 μm or less, and more preferably 200 μm or less.

[First Pressure-Sensitive Adhesive Layer]

The first pressure-sensitive adhesive layer can be made of an adhesive. The adhesive is preferably a pressure-sensitive adhesive.

As the pressure-sensitive adhesive (pressure-sensitive adhesive composition) forming the first pressure-sensitive adhesive layer, for example, one type or a combination of two or more types of a rubber-based pressure-sensitive adhesive, an acrylic pressure-sensitive adhesive, a vinyl alkyl ether-based pressure-sensitive adhesive, a silicone-based pressure-sensitive adhesive, a polyester-based pressure-sensitive adhesive, a polyamide-based pressure-sensitive adhesive, a urethane-based pressure-sensitive adhesive, a fluorine-based pressure-sensitive adhesive, a styrene-diene block copolymer-based pressure-sensitive adhesive, and an epoxy-based pressure-sensitive adhesive can be used. In addition, a photocurable pressure-sensitive adhesive (such as an ultraviolet curable pressure-sensitive adhesive) can also be used as the pressure-sensitive adhesive.

The thickness of the first pressure-sensitive adhesive layer is preferably 50 μm or more, more preferably 100 μm or more, and even more preferably 300 μm or more. In addition, the thickness of the first pressure-sensitive adhesive layer is preferably 2 mm or less, more preferably 1.5 mm or less, and even more preferably 1 mm or less.

When a curing reaction by heat or an active energy ray is used in preparation of the pressure-sensitive adhesive composition, it is preferable that the pressure-sensitive adhesive composition contains a polymerization initiator such as a thermal polymerization initiator or a photopolymerization initiator. As the polymerization initiator, the photopolymerization initiator can be preferably used in view of an advantage that a polymerization time can be shortened. The polymerization initiator may be used alone or in combination of two or more types thereof.

The first pressure-sensitive adhesive layer may further have a bubble structure. The "bubble structure" may be a structure having a gas component, and may be a "bubble" having a structure including only the gas component and having no outer shell, or may be a "hollow microsphere" having a structure in which the gas component such as a microbubble of glass is sealed in the outer shell.

The first pressure-sensitive adhesive layer (or pressure-sensitive adhesive composition) may contain an appropriate additive depending on use of a pressure-sensitive adhesive sheet. Examples of such additives include a crosslinking agent (for example, a polyisocyanate-based crosslinking agent, a silicone-based crosslinking agent, an epoxy-based crosslinking agent, an alkyl-etherified melamine-based crosslinking agent, or the like), a tackifier (for example, a solid, a semi-solid, or liquid tackifier at room temperature formed of a rosin derivative resin, a polyterpene resin, a petroleum resin, an oil-soluble phenol resin, or the like), a plasticizer, a filler, an anti-aging agent, an antioxidant, a coloring agent (a pigment, a dye, or the like), and the like.

The pressure-sensitive adhesive composition for forming the first pressure-sensitive adhesive layer can be prepared by mixing a monomer component (for example, alkyl (meth)

acrylate) forming the base polymer and, if necessary, the hollow microsphere, the polymerization initiator, various additives, and the like using a known method. In addition, the monomer component may be partially polymerized as necessary, for adjusting a viscosity.

Specific examples of a preparation method include a following procedure. (i) The monomer component (for example, the alkyl (meth) acrylate or other copolymerizable monomer) for forming the base polymer and the polymerization initiator (for example, the photopolymerization initiator) are mixed to prepare a monomer mixture, and (ii) a polymerization reaction (for example, ultraviolet ray polymerization) according to a type of the polymerization initiator is performed on the monomer mixture to prepare a composition (syrup) in which only some of the monomer component is polymerized. Then, (iii) the obtained syrup is blended with the hollow microsphere, a fluorine-based surfactant and other additives, as necessary. Further, when the bubble is contained, (iv) the pressure-sensitive adhesive composition can be obtained by introducing the bubble into a blended material obtained in (iii) and mixing the bubble and the blended material. The preparation method for the pressure-sensitive adhesive composition is not limited thereto, and for example, a preparation method such as blending the fluorine-based surfactant or the hollow microsphere in advance in the monomer mixture may be used when preparing the syrup.

The first pressure-sensitive adhesive layer can be formed by a known or common method. Examples thereof include a method in which the above pressure-sensitive adhesive composition is applied onto the first substrate to form the first pressure-sensitive adhesive layer, and the first pressure-sensitive adhesive layer is cured (for example, cured by heat or cured by the active energy ray) or dried as necessary. Above all, as described above, curing by irradiation with the active energy ray is preferable.

The above pressure-sensitive adhesive composition may be applied onto a support substrate, cured, and dried to manufacture the pressure-sensitive adhesive sheet, and then the pressure-sensitive adhesive sheet may be adhered to the first substrate and the support substrate may be released to form the first pressure-sensitive adhesive layer.

As the pressure-sensitive adhesive sheet, a commercially available product can also be used, and for example, "HYPERJOINT H7004, H7008, H7012, H8008, H9008" (substrateless double-sided pressure-sensitive adhesive sheet) manufactured by Nitto Denko Corporation can be used.

[Resin Portion]

The resin portion is preferably transparent or translucent. Since the resin portion is transparent or translucent, the position of the FBG sensor held in the resin portion can be grasped more accurately. Therefore, positioning when attaching the FBG sensor to the object is easy.

The resin portion has an initial tensile elastic modulus at 25° C. of preferably $1.0 \times 10^8$ Pa or more, more preferably $5.0 \times 10^8$ Pa or more, and even more preferably $1.0 \times 10^9$ Pa or more.

A thickness of the resin portion is preferably 200 µm or more, more preferably 400 µm or more, and even more preferably 800 µm or more. In addition, the thickness of the resin portion is preferably 3 mm or less, more preferably 2 mm or less, and even more preferably 1.5 mm or less.

The resin portion can be formed of the resin composition. The resin composition may contain a curable resin or a thermoplastic resin, and preferably contains a resin that is cured at room temperature. By appropriately combining the curable resin and the curing agent, the resin can be cured at room temperature. Examples of the curable resin include an epoxy resin, a phenol resin, an amino resin, an unsaturated polyester resin, a polyurethane resin, a silicone resin, and a thermosetting polyimide resin, and the epoxy resin is preferable. Since the epoxy resin tends to have a small content of ionic impurities or the like that may cause deterioration of the FBG sensor, the epoxy resin is preferable as the curable resin in the resin portion. The resin composition may contain one type of curable resin, or may contain two or more types of curable resins.

In addition, an amine-based curing agent, an imidazole-based curing agent, a thiol-based curing agent, and the like are preferable as the curing agent for exhibiting room temperature curing properties in the epoxy resin.

Examples of the epoxy resin include bifunctional epoxy resins and polyfunctional epoxy resins such as a bisphenol A type epoxy resin, a bisphenol F type epoxy resin, a bisphenol S type epoxy resin, a brominated bisphenol A type epoxy resin, a hydrogenated bisphenol A type epoxy resin, a bisphenol AF type epoxy resin, a biphenyl type epoxy resin, a naphthalene type epoxy resin, a fluorene type epoxy resin, a phenol novolac type epoxy resin, an orthocresol novolac type epoxy resin, a trishydroxyphenylmethane type epoxy resin, and a tetraphenylolethane type epoxy resin. Examples of the epoxy resin also include a hydantoin type epoxy resin, a trisglycidylisocyanurate type epoxy resin, and a glycidylamine type epoxy resin. The resin portion may contain one type of epoxy resin or two or more types of epoxy resins.

As the epoxy resin, a commercially available product can also be used, and for example, "jER828, bisphenol A type epoxy resin" (viscosity at 25° C. is 12 Ps·s to 15 Ps·s) manufactured by Mitsubishi Chemical Corporation can be used.

As the curing agent, a commercially available product can also be used, and for example, "ST-12, modified aliphatic polyamine" (viscosity at 25° C. is 1650 mPa·s to 3300 mPa·s) manufactured by Mitsubishi Chemical Corporation can be used.

A content ratio of the curable resin in the resin portion is preferably from 5% by mass to 60% by mass, and more preferably from 10% by mass to 50% by mass, from a viewpoint of appropriately curing the resin portion.

[Adhesive Layer]

The adhesive layer according to the present embodiment is positioned on the surface of the resin portion on the side opposite to the first substrate. As a result, the FBG sensor protected by the resin portion is attached to the object by the adhesive layer.

The object and the FBG sensor held by the resin portion are adhered to each other by the adhesive layer according to the present embodiment before the adhesive layer is cured, and the object and the FBG sensor held by the resin portion are strongly adhered by the curing of the adhesive layer, and the sensitivity of the FBG sensor can be prevented from being greatly reduced.

In order to highly detect the information from the object and to prevent the sensitivity of the FBG sensor from being greatly reduced, an elastic modulus of the cured layer formed on the adhesive layer by curing is preferably $1.0 \times 10^8$ Pa or more, more preferably $3.0 \times 10^8$ Pa or more, and even more preferably $5.0 \times 10^8$ Pa or more.

The adhesive layer is a layer (sheet) to be cured by contacting and reacting with the curing agent, extends along a surface direction (direction orthogonal to the thickness direction), and has a substantially flat plate shape having a flat front surface and flat back surface. The curing agent for curing the adhesive layer will be described later.

The adhesive layer is formed in a layer shape by an adhesive component.

The adhesive component is not particularly limited as long as the adhesive component is a main agent of a two-liquid type adhesive agent capable of forming a layer, and examples thereof include a silicone compound, for example, a polyol compound such as polypropylene glycol, for example, a urethane resin, and for example, an epoxy resin. The adhesive component preferably contains the epoxy resin as a main component. Accordingly, the FBG sensor, the resin portion, and the object can be easily and strongly adhered to each other.

Examples of the epoxy resin include bisphenol-based epoxy resins such as a bisphenol A type epoxy resin, a bisphenol F type epoxy resin, a bisphenol S type epoxy resin, and a hydrogenated bisphenol A type epoxy resin, for example, a naphthalene type epoxy resin, for example, a biphenyl type epoxy resin, for example, a dicyclo type epoxy resin, for example, an alicyclic epoxy resin, for example, a triglycidyl isocyanurate epoxy resin, for example, a hydantoin epoxy resin, for example, a glycidyl ether-based epoxy resin, for example, a glycidylamino-based epoxy resin.

The epoxy resin is preferably a bisphenol-based epoxy resin. The epoxy resin can be used alone or in combination of two or more types thereof.

The epoxy resin may be in any form of liquid, semi-solid, and solid at room temperature, but preferably, a semi-solid epoxy resin used alone, or a liquid epoxy resin and a solid epoxy resin used in combination. This makes it possible to reliably form a layered adhesive layer with tackiness from the adhesive component.

Specifically, the liquid epoxy resin at room temperature is liquid at 25° C. A viscosity of the liquid epoxy resin is, for example, 30 Pa·s or more, and preferably 80 Pa·s or more, and for example, 500 Pa·s or less, and preferably 300 Pa·s or less, at 25° C.

Specifically, the solid epoxy resin at room temperature is solid at 25° C. The solid epoxy resin has a softening point of, for example, 70° C. or more, and preferably 75° C. or more.

A blending ratio of the liquid epoxy resin to the solid epoxy resin (liquid epoxy resin/solid epoxy resin (mass ratio)) is, for example, 1.0 or more, and preferably 1.5 or more, and, for example, 4.0 or less, and preferably 3.0 or less.

When the blending ratio of the liquid epoxy resin to the solid epoxy resin is a lower limit or more described above, a viscosity of the adhesive component can be reduced, and occurrence of unevenness in coating can be prevented, and a uniform adhesive layer can be obtained. When the blending ratio of the liquid epoxy resin to the solid epoxy resin is an upper limit or less described above, a layered adhesive layer with tackiness can be obtained.

The blending ratio of the epoxy resin is set to a ratio in which the epoxy resin is the main component in the adhesive component, and specifically, for example, 70% by mass or more, preferably 75% by mass or more, more preferably 80% by mass or more, and even more preferably 90% by mass or more, and for example, 100% by mass or less with respect to the adhesive component.

Preferably, the adhesive component is formed of only the epoxy resin, that is, the blending ratio of the epoxy resin with respect to the adhesive component is 100% by mass.

If necessary, an acrylic polymer can be blended to the adhesive component. Accordingly, a cohesive force of the adhesive component can be improved.

The acrylic polymer is obtained by reacting the monomer component containing (meth) acrylate. The (meth) acrylate is an alkyl methacrylate and/or an alkyl acrylate, and specific examples thereof include an alkyl (meth) acrylate having 1 to 20 carbon atoms such as methyl (meth) acrylate, ethyl (meth) acrylate, propyl (meth) acrylate, isopropyl (meth) acrylate, butyl (meth) acrylate, isobutyl (meth) acrylate, s-butyl (meth) acrylate, t-butyl (meth) acrylate, n-butyl (meth) acrylate, pentyl (meth) acrylate, isopentyl (meth) acrylate, hexyl (meth) acrylate, heptyl (meth) acrylate, octyl (meth) acrylate, 2-ethylhexyl (meth) acrylate, isooctyl (meth) acrylate, nonyl (meth) acrylate, isononyl (meth) acrylate, decyl (meth) acrylate, isodecyl (meth) acrylate, undecyl (meth) acrylate, dodecyl (meth) acrylate, tridecyl (meth) acrylate, tetradecyl (meth) acrylate, pentadecyl (meth) acrylate, hexadecyl (meth) acrylate, heptadecyl (meth) acrylate, octadecyl (meth) acrylate, nonadecyl (meth) acrylate, and eicosyl (meth) acrylate.

The (meth) acrylate is preferably the alkyl (meth) acrylate having 2 to 14 carbon atoms, and more preferably the alkyl (meth) acrylate having 4 to 9 carbon atoms.

The (meth) acrylate can be used alone or in combination of two or more types thereof.

A blending ratio of the (meth) acrylate with respect to the monomer component is, for example, 70% by mass or more, and preferably 80% by mass or more, and for example, 99% by mass or less, and preferably 98% by mass or less.

The monomer component can further contain a copolymerizable monomer copolymerizable with the (meth) acrylate.

Examples of the copolymerizable monomer include a carboxyl group-containing monomer such as (meth) acrylic acid, itaconic acid, maleic acid, crotonic acid, and maleic anhydride, or an acid anhydride thereof; a hydroxyl group-containing (meth) acrylate such as 2-hydroxyethyl (meth) acrylate and 3-hydroxypropyl (meth) acrylate; an amide group-containing monomer such as (meth) acrylamide, N,N-dimethyl (meth) acrylamide, N-methylol (meth) acrylamide, N-methoxymethyl (meth) acrylamide, and N-butoxymethyl (meth) acrylamide; a vinyl ester such as vinyl acetate; an aromatic vinyl compound such as styrene and vinyltoluene; a (meth) acrylonitrile; an N (meth) acryloylmorpholine; and an N-vinyl-2-pyrrolidone.

The copolymerizable monomer is preferably a carboxyl group-containing monomer and a hydroxyl group-containing (meth) acrylate, and more preferably a (meth) acrylic acid or 2-hydroxyethyl (meth) acrylate.

These copolymerizable monomers can be used alone or in combination of two or more types thereof. The copolymerizable monomer is preferably a combination of the carboxyl group-containing monomer and the hydroxyl group-containing (meth) acrylate, and more preferably a combination of the (meth) acrylic acid and 2-hydroxyethyl (meth) acrylate.

A blending ratio of the copolymerizable monomer with respect to 100 parts by mass of the (meth) acrylate is, for example, 0.1 part by mass or more, and preferably 0.3 part by mass or more, and for example, 15 parts by mass or less, and preferably 10 parts by mass or less.

In order to react the monomer component, for example, the (meth) acrylate and, if necessary, the copolymerizable monomer are blended to prepare the monomer component, which is prepared, for example, by a known polymerization method such as solution polymerization, bulk polymerization, emulsion polymerization, and various radical polymerizations.

The polymerization method is preferably the solution polymerization.

In the solution polymerization, for example, the monomer component and the polymerization initiator are blended in a solvent to prepare a monomer solution, and then the monomer solution is heated.

Examples of the solvent include an organic solvent. Examples of the organic solvent include an aromatic solvent such as toluene, benzene, and xylene; an ether-based solvent such as ethyl acetate; a ketone-based solvent such as acetone and methyl ethyl ketone; an ester-based solvent such as ethyl acetate; and an amide-based solvent such as N,N-dimethylformamide. The solvent can be used alone or in combination of two or more types thereof, and preferably a combination of the aromatic solvent and the ether-based solvent. A blending ratio of the solvent with respect to 100 parts by mass of the monomer component is, for example, 10 parts by mass or more, and preferably 50 parts by mass or more, and for example, 1000 parts by mass or less, and preferably 500 parts by mass or less.

Examples of the polymerization initiator include a peroxide-based polymerization initiator and an azo-based polymerization initiator.

Examples of the peroxide-based polymerization initiator include organic peroxides such as peroxycarbonate, ketone peroxide, peroxyketal, hydroperoxide, dialkyl peroxide, diacyl peroxide, and peroxyester.

Examples of the azo-based polymerization initiator include azo compounds such as 2,2'-azobisisobutyronitrile, 2,2'-azobis (2-methylbutyronitrile), 2,2'-azobis (2,4-dimethylvaleronitrile), and dimethyl 2,2'-azobisisobutyrate.

The polymerization initiator is preferably the azo-based polymerization initiator.

A blending ratio of the polymerization initiator with respect to 100 parts by mass of the monomer component is, for example, 0.01 part by mass or more, and preferably 0.05 part by mass or more, and for example, 5 parts by mass or less, and preferably 3 parts by mass or less.

A heating temperature is, for example, 50° C. or more and 80° C. or less, and a heating time is, for example, 1 hour or more and 24 hours or less.

Accordingly, the monomer component is polymerized to obtain the acrylic polymer solution containing the acrylic polymer.

The acrylic polymer solution is blended in the epoxy resin so that a blending ratio of the acrylic polymer with respect to 100 parts by mass of the adhesive component is, for example, 1 part by mass or more, and preferably 2 parts by mass or more, and for example, 50 parts by mass or less, and preferably 30 parts by mass or less. A blending ratio of the acrylic polymer with respect to 100 parts by mass of the epoxy resin is, for example, 1 part by mass or more, and preferably 2 parts by mass or more, and for example, 43 parts by mass or less, and preferably 35 parts by mass or less.

When the blending ratio of the acrylic polymer is a lower limit or more described above, the cohesive force of the adhesive component, and consequently an adhesive strength, can be improved, and a releasing adhesive strength of the adhesive layer can be improved.

When the blending ratio of the acrylic polymer is an upper limit or less described above, the acrylic polymer can be cured.

A trace amount of the curing agent may be blended to the adhesive component. Accordingly, a cohesive force of the adhesive layer can be improved. Examples of the curing agent will be described later.

A blending ratio of the curing agent is adjusted to a ratio such that the releasing adhesive strength of the adhesive layer is improved and the adhesive component is slightly cured (not completely cured).

To obtain the adhesive component, for example, the epoxy resin and, if necessary, the acrylic polymer (acrylic polymer solution) and/or the curing agent are blended, and if necessary, diluted with the solvent to prepare a varnish.

The solvent may be any solvent as long as the solvent can dissolve the adhesive component, and examples thereof include the above-described solvent. The solvent is preferably the ketone-based solvent.

A concentration of the adhesive component in the varnish is, for example, 20% by mass or more, and preferably 40% by mass or more, and for example, 80% by mass or less, and preferably 70% by mass or less.

When the acrylic polymer is blended with the adhesive component, the crosslinking agent can be blended when preparing the adhesive component.

Examples of the crosslinking agent include an isocyanate-based crosslinking agent, an aziridine-based crosslinking agent, an epoxy-based crosslinking agent, and a metal chelate-based crosslinking agent, and preferably the isocyanate-based crosslinking agent.

Examples of the isocyanate-based crosslinking agent include aromatic diisocyanate such as tolylene diisocyanate and xylene diisocyanate; alicyclic diisocyanate such as isophorone diisocyanate; aliphatic diisocyanate such as hexamethylene diisocyanate; and modified products of these isocyanates (specifically, tolylene diisocyanate adducts of trimethylolpropane).

The crosslinking agent is preferably the isocyanate modified product. A blending ratio of the crosslinking agent with respect to 100 parts by mass of the acrylic polymer is, for example, 1 part by mass or more, and preferably 5 parts by mass or more, and for example, 20 parts by mass or less, and preferably 15 parts by mass or less. Accordingly, the adhesive component is prepared.

Then, as will be described later, the adhesive layer is formed to have a predetermined thickness by applying the adhesive component on the substrate and drying the adhesive component.

A thickness of the adhesive layer is, for example, 1 μm or more, preferably 5 μm or more, and more preferably 10 μm or more, and is, for example, 1000 μm or less, preferably 500 μm or less, and more preferably 100 μm or less.

The curing agent can cure the adhesive layer by contacting and reacting with the adhesive layer, and may be a curing agent layer (sheet), and in this case, the curing agent extends along the surface direction (direction orthogonal to the thickness direction), and has a substantially flat plate shape having a flat front surface and flat back surface.

The curing agent layer is formed in a layer shape from a curing component, and the curing component contains the curing agent.

The curing agent is not particularly limited as long as the curing agent is a curing agent for the two-liquid type adhesive, and examples of the curing agent include an epoxy resin curing agent such as an imidazole compound, an amine compound, and an amide compound when the adhesive component contains the epoxy resin.

Examples of the imidazole compound include methylimidazole, 2-ethyl-4-methylimidazole, 1-isobutyl-2-methylimidazole, 1-benzyl-2-methylimidazole, 2-ethyl-4-methylimidazole, ethylimidazole, isopropylimidazole, 2,4-dimethylimidazole, phenylimidazole, undecylimidazole, heptadecylimidazole, 2-phenyl-4-methylimidazole, 2-phenyl-4,5-dihydroxymethylimidazole, and 2-phenyl-4-methyl-5-hydroxymethylimidazole, preferably 1-isobutyl-2-methylimidazole, 1-benzyl-2-methylimidazole, and 2-ethyl-4-methylimidazole, more preferably 1-isobutyl-2-methylimidazole and 1-benzyl-2-methylimidazole, and even more preferably 1-isobutyl-2-methylimidazole.

Examples of the amine compound include ethylenediamine, propylenediamine, diethylenetriamine, triethylenetetramine, an amine adduct thereof, metaphenylenediamine, diaminodiphenylmethane, and diaminodiphenyl sulfone.

Examples of the amide compound include dicyandiamide and polyamide, and preferably the dicyandiamide.

The curing agent is preferably the imidazole compound.

The curing agent can be used alone or in combination of two or more types thereof.

A blending ratio of the curing agent with respect to the curing component is, for example, 10% by mass or more, preferably 30% by mass or more, more preferably 50% by mass or more, still more preferably 80% by mass or more, and particularly preferably 90% by mass or more, and for example, 100% by mass or less. When the blending ratio of the curing agent is a lower limit or more described above, the adhesive layer is excellent in the adhesiveness.

Preferably, the curing component is formed of only the curing agent, that is, the ratio of the curing agent with respect to the curing component is 100% by mass.

If necessary, a curing accelerator can be blended with the curing component.

Examples of the curing accelerator include a urea compound such as 3-(3,4-dichlorophenyl)-1,1-dimethylurea (DCMU), N'-phenyl-N,N-dimethylurea, and 1,1'-(methyl-m-phenylene) bis (3,3'-dimethylurea); a tertiary amine compound such as triethylenediamine and tri-2,4,6-dimethylaminomethylphenol; a phosphorus compound such as triphenylphosphine, tetraphenylphosphonium tetraphenylborate, and tetra-n-butylphosphonium-o,o-diethylphosphorodithioate; a quaternary ammonium salt compound; an organic metal salt compound, preferably a urea compound, and more preferably 3-(3,4-dichlorophenyl)-1,1-dimethylurea.

The curing accelerator can be used alone or in combination of two or more types thereof.

A blending ratio of the curing accelerator with respect to the curing component is, for example, 10% by mass or more, preferably 15% by mass or more, and more preferably 25% by mass or more, and for example, 40% by mass or less. A blending ratio of the curing accelerator with respect to 100 parts by mass of the curing agent is 10 parts by mass or more, and preferably 25 parts by mass or more, and for example, 60 parts by mass or less, and preferably 50 parts by mass or less.

In order to prepare the curing component, the curing agent and, if necessary, the curing accelerator are blended.

If the curing agent is solid, if necessary, the curing agent is dissolved in a solvent to prepare the varnish.

The solvent may be any solvent as long as the solvent can dissolve the curing component, and examples thereof include the above-described solvent.

A concentration of the curing component in the varnish is, for example, 10% by mass or more, and preferably 20% by mass or more, and for example, 90% by mass or less, and preferably 50% by mass or less.

Accordingly, the curing component is prepared.

Then, as will be described later, the curing agent is formed to have a predetermined thickness by applying the curing component on the adhesive layer or the substrate and drying the curing component.

A thickness at the time of applying the curing agent is, for example, 1 µm or more, preferably 5 µm or more, and more preferably 10 µm or more, and is, for example, 1000 µm or less, preferably 800 µm or less, and more preferably 500 µm or less.

Then, the adhesive layer is interposed between the object and the FBG sensor and the resin portion such that the adhesive layer contacts the resin portion holding the FBG sensor and the curing agent contacts the adhesive layer.

In the adhesive layer, the adhesive component has pressure-sensitive adhesiveness before curing.

The pressure-sensitive adhesiveness before curing means that the adhesive component has the pressure-sensitive adhesiveness by the reaction of the adhesive component with the curing component before the adhesive component is completely cured, and specifically, from before the adhesive component and the curing component are blended to after the blending, until the adhesive component is completely cured.

That is, the adhesive layer containing the adhesive component has the pressure-sensitive adhesiveness.

Specifically, the releasing adhesive strength of the adhesive layer with respect to an aluminum plate is, for example, 0.5 N/20 mm or more, preferably 1.0 N/20 mm or more, more preferably 2.0 N/20 mm or more, even more preferably 3.0 N/20 mm or more, and particularly preferably 3.5 N/20 mm or more, and for example, 10 N/20 mm or less.

When the releasing adhesive strength of the adhesive layer with respect to the aluminum plate is a lower limit or more described above, the adhesive layer is excellent in the pressure-sensitive adhesiveness, and can adhere the FBG sensor and the object and position the FBG sensor.

The releasing adhesive strength of the adhesive layer is obtained as the releasing adhesive strength of the adhesive layer when the adhesive layer is adhered to the aluminum plate and then the adhesive layer is released from the aluminum plate by 90 degrees at a speed of 300 mm/min.

Thus, preferably, since the adhesive layer has the pressure-sensitive adhesiveness, the object and the FBG sensor are adhered to each other by the adhesive layer and the first pressure-sensitive adhesive layer before the adhesive layer is cured. Therefore, it is easy to reliably position the FBG sensor with respect to the object.

Thereafter, the adhesive layer reacts with the curing agent to be cured.

The reaction temperature is, for example, the room temperature.

In addition, if necessary, the adhesive layer and the curing agent may be heated, and the heating temperature is, for example, 50° C. or more, and preferably 70° C. or more, and for example, 160° C. or less, and preferably 110° C. or less.

The reaction temperature is preferably the room temperature. The room temperature is a temperature at which the above heating (for example, heating of 50° C. or more) for reacting the adhesive layer with the curing agent is not performed, for example, less than 50° C., and preferably 40° C. or less, and is, for example, 10° C. or more, and preferably 20° C. or more.

When the reaction temperature is the room temperature, heating for reacting the adhesive layer with the curing agent is not required, and the FBG sensor 10 and the object can be more easily adhered. In addition, it is possible to prevent the FBG sensor 10 from being damaged by heating.

The reaction time is, for example, 15 minutes or more, preferably 1 hour or more, and more preferably 12 hours or more, and for example, 96 hours or less, and preferably 48 hours or less. Accordingly, the adhesive layer is cured. Preferably, the adhesive layer is cured at room temperature.

A thickness of the adhesive layer after curing is, for example, 1 μm or more, preferably 5 μm or more, and more preferably 30 μm or more, and is, for example, 2000 μm or less, preferably 1000 μm or less, more preferably 500 μm or less, and even more preferably 100 μm or less.

By the adhesive layer after curing, the FBG sensor, the resin portion, and the object are adhered to each other.

[Second Substrate]

The second substrate is preferably a film, and is preferably a resin film that plays a role of protection and decoration. The second substrate may be, for example, a weather resistant film such as a moisture resistant film or a light resistant film, a design film, a surface protective film such as a decorative film or a scratch resistant film, or the like. From a viewpoint of outdoor use, the second substrate is preferably the weather resistant film.

Examples of the resin forming the resin film include polyimide, polyethylene (PE), polypropylene (PP), fluorinated ethylene propylene copolymer (FEP), ethylene-tetrafluoroethylene copolymer (ETFE), polytetrafluoroethylene (PTFE), polyethylene terephthalate (PET), tetrafluoroethylene-perfluoroalkyl vinyl ether copolymer (PFA), and polyvinylidene difluoride (PVDF), and preferably polyvinylidene difluoride (PVDF).

[Second Pressure-Sensitive Adhesive Layer]

The second pressure-sensitive adhesive layer can be used without particular limitation. For example, a polymer such as, as a base polymer, an acrylic polymer, a silicone polymer, a polyester, a polyurethane, a polyamide, a polyvinyl ether, a vinyl acetate/vinyl chloride copolymer, a modified polyolefin, an epoxy-based polymer, a fluorine-based polymer, a rubber-based polymer such as a natural rubber and a synthetic rubber may be appropriately selected and used. The acrylic pressure-sensitive adhesive is preferably used in terms of exhibiting adhesive properties such as appropriate wettability, cohesiveness, and adhesiveness, and being excellent in weather resistance, heat resistance, and the like.

[Release Liner]

The first release liner and the second release liner that protect the first pressure-sensitive adhesive layer and the second pressure-sensitive adhesive layer until use will be described.

The first release liner and the second release liner are not particularly limited, and a common release liner or the like can be used, and for example, a substrate including a release-treated layer, a low adhesive substrate formed of the fluorine-based polymer, and a low adhesive substrate formed of a nonpolar polymer can be used.

Examples of the substrate including the release-treated layer include a plastic film or paper surface-treated with a release treatment agent such as a silicone-based release treatment agent, a long-chain alkyl-based release treatment agent, a fluorine-based release treatment agent, and molybdenum sulfide.

Examples of the fluorine-based polymer of the low adhesive substrate formed of the fluorine-based polymer include polytetrafluoroethylene, polychlorotrifluoroethylene, polyvinyl fluoride, polyvinylidene difluoride, a tetrafluoroethylene-hexafluoropropylene copolymer, and a chlorofluoroethylene-vinylidene fluoride copolymer.

Examples of the nonpolar polymer of the low adhesive substrate formed of a nonpolar polymer include olefin-based resins (for example, polyethylene, and polypropylene). The release liner can be formed by a known or common method. A thickness and the like of the release liner are also not particularly limited.

[Object]

The object to which the FBG sensor is attached is not particularly limited as long as the object can be an object to be measured by the FBG sensor, and examples thereof include various structures such as a metal product, a wood product, a plastic product, a glass product, a building (an inner and outer wall surface, a floor surface, a ceiling surface, a road, a railroad, and a bridge), an electronic device, a transportation device (for example, a vehicle such as an automobile, a two-wheeled vehicle, and a railway, and a ship).

EXAMPLE

Hereinafter, the present invention will be specifically described with reference to Examples, but the present invention is not limited to these Examples.

[Preparation of Adhesive Layer]69 parts by mass of a liquid bisphenol A type epoxy resin (trade name "jER828", manufactured by Mitsubishi Chemical Corporation), 30 parts by mass of a solid bisphenol A type epoxy resin (trade name "jER1256", manufactured by Mitsubishi Chemical Corporation), and 1 part by mass of a solid special novolac type epoxy resin (trade name "jER157S70", manufactured by Mitsubishi Chemical Corporation) were mixed, and methyl ethyl ketone was added to dilute the mixture so that a concentration of the epoxy resin became 65% by mass to prepare a varnish. The varnish was applied to a release-treated surface of a release-treated polyethylene terephthalate film (trade name Diafoil MRF #38, manufactured by Mitsubishi Plastics, Inc.) so that a thickness after drying became 50 μm, and heating is performed at 80° C. for 3 minutes and drying is performed to obtain an adhesive layer. Thereafter, the adhesive layer was brought into contact with another polyethylene terephthalate film so that the adhesive layer was sandwiched between the two polyethylene terephthalate films.

Manufacturing Example 1

Figure 12A:
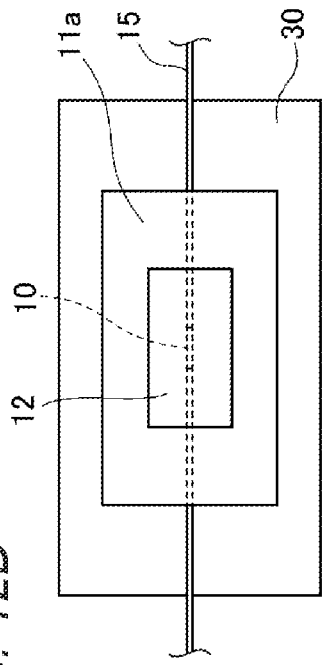
FIGS. 12A to 12F are schematic views showing a Manufacturing Example of the sensor package.

An pressure-sensitive adhesive layer (HYPERJOINT H7008, manufactured by Nitto Denko Corporation) was cut into a size of 50 mm×30 mm, and as shown in FIG. 12A, a center portion was cut to provide the opening portion of 20 mm×10 mm, and the first pressure-sensitive adhesive layer 11a and the first pressure-sensitive adhesive layer 11b were prepared.

Figure 11A:
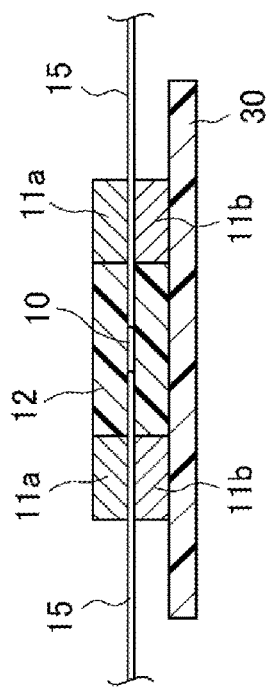
FIGS. 11A to 11F are schematic cross-sectional views showing a Manufacturing Example of the sensor package.

As shown in FIGS. 11A and 12A, the first pressure-sensitive adhesive layer 11b was disposed on the release liner 30 (Diafoil MRF #38, manufactured by Mitsubishi Plastics, Inc.).

Figure 11B:
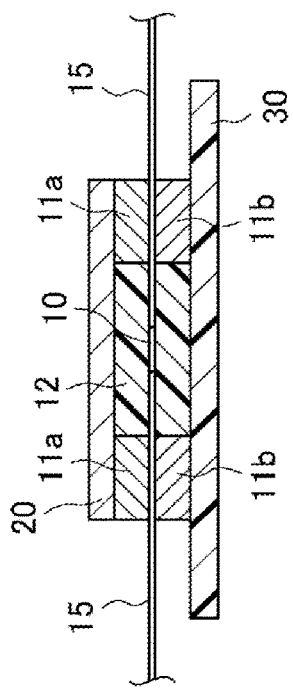
Figure 12B:
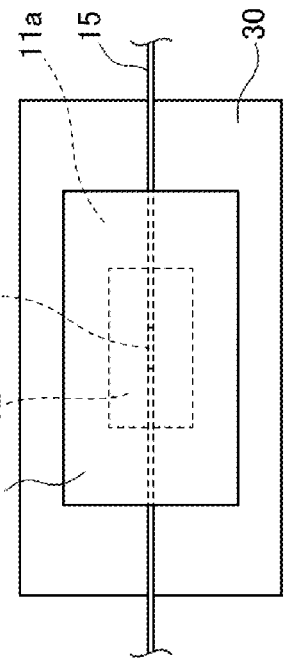

As shown in FIGS. 11B and 12B, the optical fiber with the FBG sensor 10 having the outer diameter of 0.125 mm was placed so that the FBG sensor 10 was positioned in the opening portion of the first pressure-sensitive adhesive layer 11b.

Figure 11C:
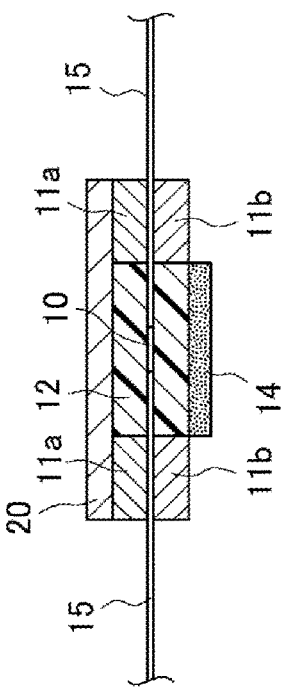
Figure 12C:
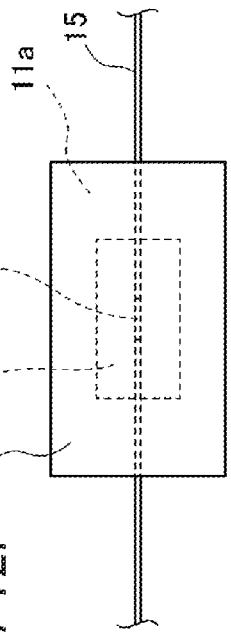

Further, as shown in FIGS. 11C and 12C, the first pressure-sensitive adhesive layer 11a was stacked on the first pressure-sensitive adhesive layer 11b and the optical fiber. At this time, the first pressure-sensitive adhesive layer 11a was pressed against the first pressure-sensitive adhesive layer 11b. Accordingly, the gap between the optical fiber, the first pressure-sensitive adhesive layer 11a, and the first pressure-sensitive adhesive layer 11b is filled, and the FBG sensor 10 is disposed in the opening portions of the first pressure-sensitive adhesive layer 11a and the first pressure-sensitive adhesive layer 11b.

Figure 11D:
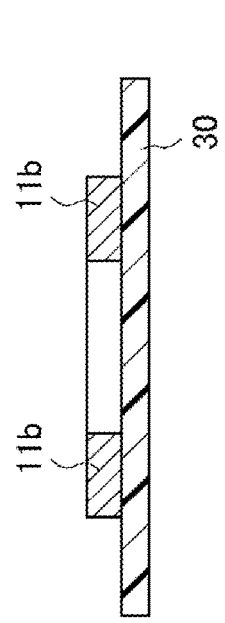
Figure 12D:
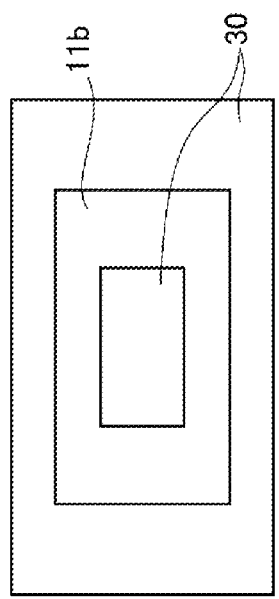

Next, as shown in FIGS. 11D and 12D, the opening portion was filled with a resin that was a mixture of an epoxy resin (jER828, Mitsubishi Chemical Corporation) and a curing agent (ST-12, Mitsubishi Chemical Corporation) at a mass ratio of 100:50 and was cured at room temperature, and was allowed to stand at room temperature to be cured to form the resin portion 12.

Figure 11E:
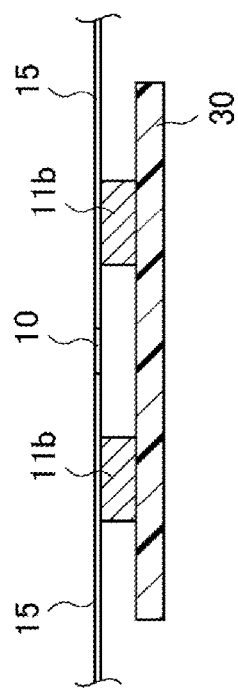
Figure 12E:
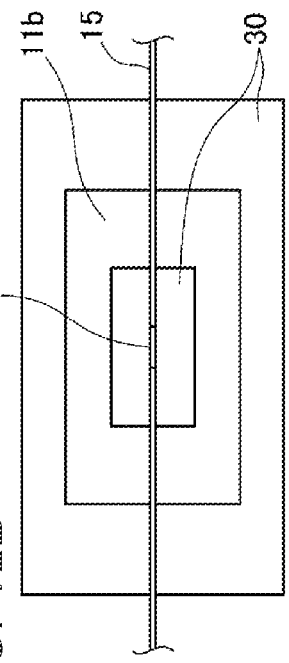

A PET substrate (Lumirror S-10 #188, manufactured by Toray Industries, Inc.) as the first substrate 20 was stacked on the first pressure-sensitive adhesive layer 11a as shown in FIGS. 11E and 12E to form a stacked structure.

Figure 11F:
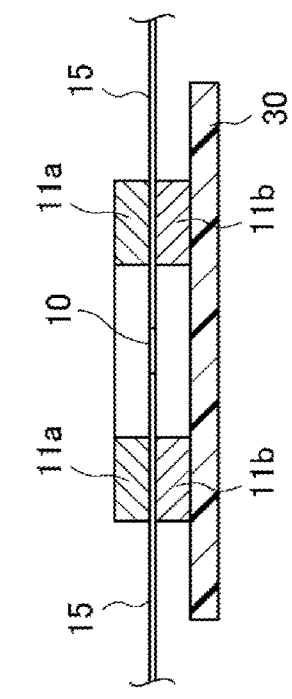
Figure 12F:
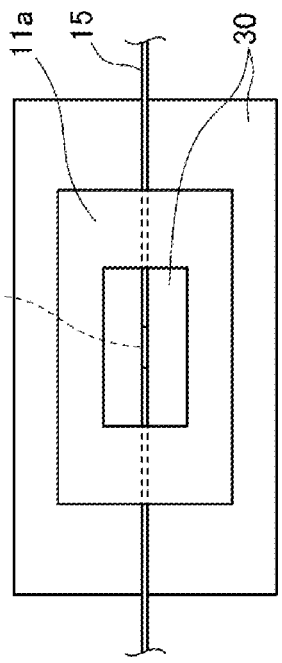

The adhesive layer prepared above was cut into 20 mm×10 mm to prepare the adhesive layer 14. As shown in FIGS. 11F and 12F, the release liner 30 was released from the stacked structure, and the adhesive layer 14 was adhered to the resin portion 12 to manufacture a sensor package.

Manufacturing Example 2

Figure 13A:
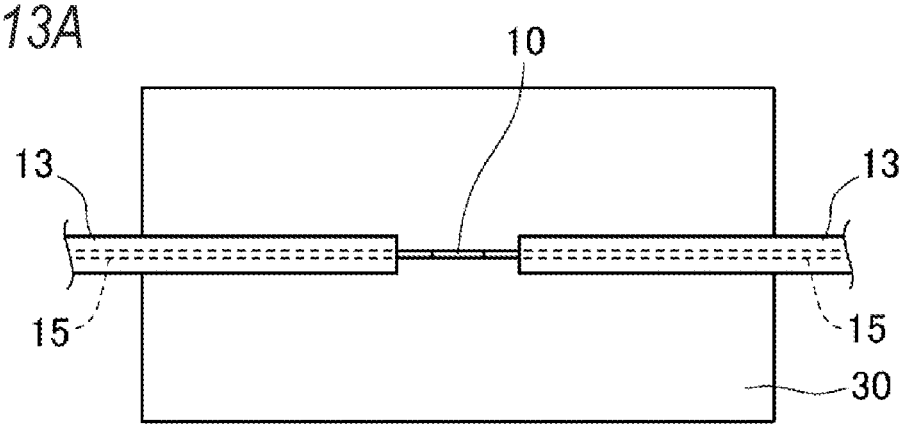
FIGS. 13A to 13C are schematic cross-sectional views showing a Manufacturing Example of the sensor package.

As shown in FIG. 13A, the optical fiber 15 with the FBG sensor 10 covered with the covering material 13 having an outer diameter of 0.9 mm was placed on the release liner 30 (Diafoil MRF #38, manufactured by Mitsubishi Plastics, Inc.).

Figure 13B:
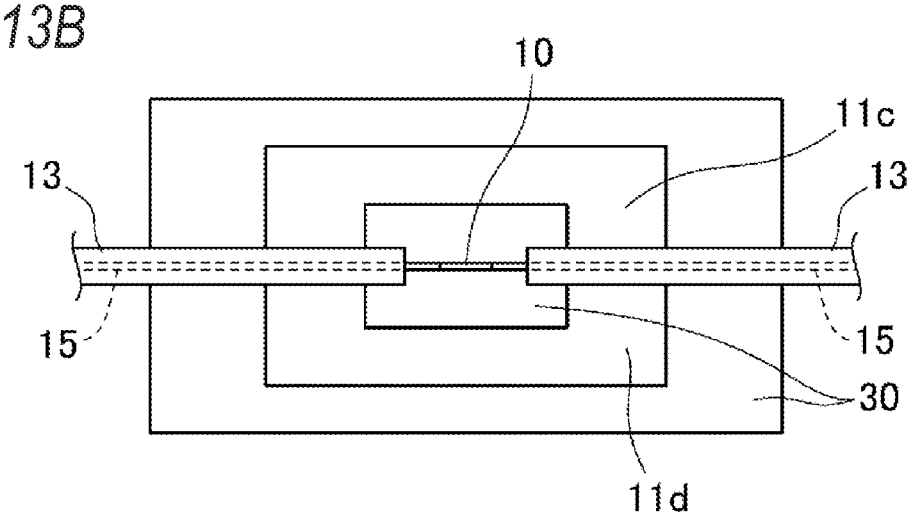

An pressure-sensitive adhesive layer (HYPERJOINT H7008, manufactured by Nitto Denko Corporation) was cut into a size of 50 mm×15 mm, and as shown in FIG. 13B, a part of the cut pressure-sensitive adhesive layer was cut into a size of 20 mm×5 mm, and the first pressure-sensitive adhesive layer 11c and the first pressure-sensitive adhesive layer 11d having a U shape were prepared.

As shown in FIG. 13B, the covering material 13 was sandwiched between the first pressure-sensitive adhesive layer 11c and the first pressure-sensitive adhesive layer 11d having the U shape. At this time, the first pressure-sensitive adhesive layer 11a and the first pressure-sensitive adhesive layer 11b were pressed against the release liner 30. Accordingly, a gap between the covering material 13, the first pressure-sensitive adhesive layer 11c, and the first pressure-sensitive adhesive layer 11d is filled, and the FBG sensor 10 is disposed in the opening portions formed by the first pressure-sensitive adhesive layer 11c and the first pressure-sensitive adhesive layer 11d.

Figure 13C:
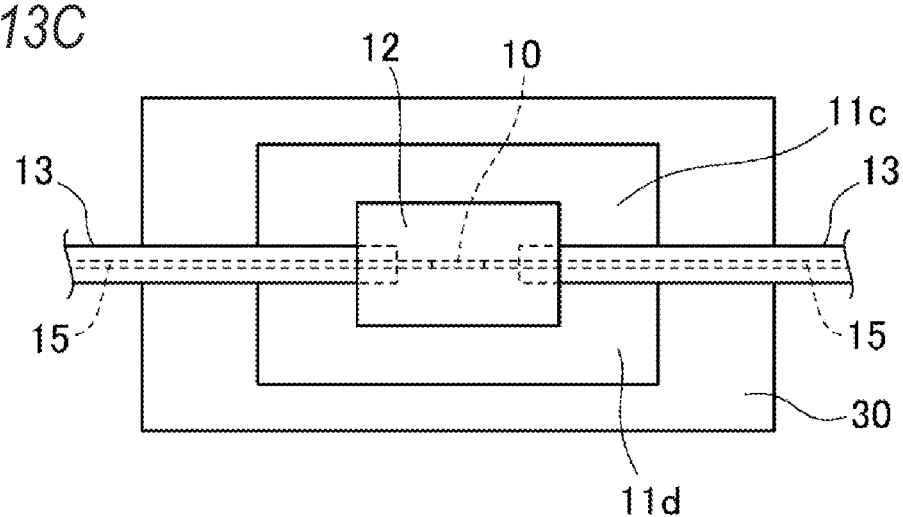
Figure 14A:
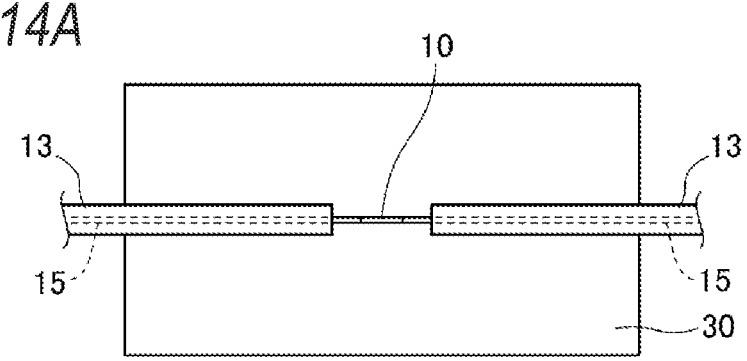
FIGS. 14A to 14D are schematic views showing a Manufacturing Example of the sensor package.
Figure 14B:
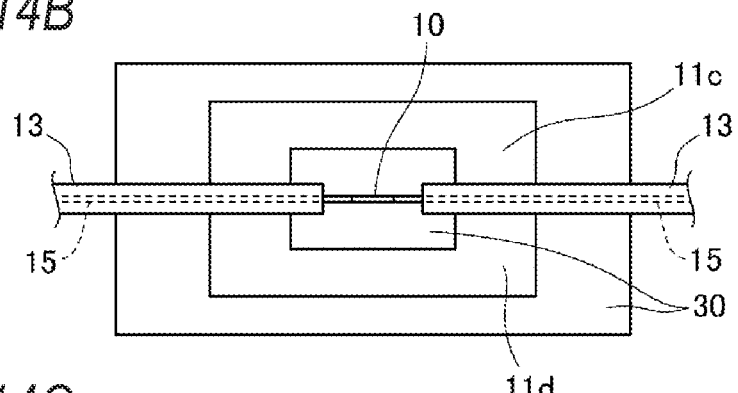
Figure 14C:
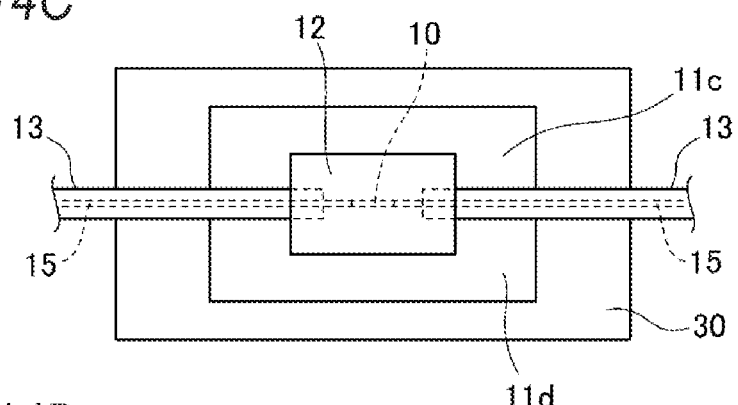
Figure 14D:
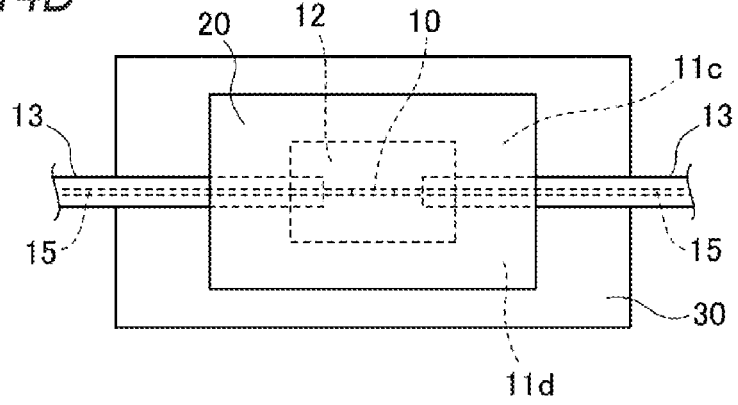

Next, as shown in FIG. 13C, the opening portion was filled with the resin that was the mixture of the epoxy resin (jER828, Mitsubishi Chemical Corporation) and the curing agent (ST-12, Mitsubishi Chemical Corporation) at the mass ratio of 100:50 and was cured at room temperature, and was allowed to stand at room temperature to be cured to form the resin portion 12.

Next, similar as in the Manufacturing Example 1, the PET substrate (Lumirror S-10 #188, manufactured by Toray Industries, Inc.) as the first substrate 20 was stacked on the first pressure-sensitive adhesive layer 11a to form the stacked structure, and the release liner 30 was released from the stacked structure, and the adhesive layer 14 cut to 20 mm×10 mm was adhered to the resin portion 12 to manufacture a sensor package.

Manufacturing Example 3

A sensor package was manufactured similarly as in Manufacturing Example 2 except that the optical fiber with the FBG sensor was changed to an optical fiber covered with a covering material having an outer diameter of 0.155 mm (the outer diameter of the covering material including the optical fiber was 0.155 mm).

Manufacturing Example 4

A sensor package was manufactured similarly as in Manufacturing Example 2 except that the optical fiber with the FBG sensor was changed to an optical fiber covered with a covering material having an outer diameter of 1 mm (the outer diameter of the covering material including the optical fiber was 1 mm).

INDUSTRIAL APPLICABILITY

A sensor package according to the present invention can be easily attached and positioned without greatly reducing sensitivity of an FBG sensor, and is excellent in workability. In addition, the sensor package is applicable to outdoor use and has high durability.

Although the present invention has been described in detail and with reference to particular embodiments, it will be apparent to those skilled in the art that various changes and modifications can be made without departing from the spirit and scope of the invention.

REFERENCE SIGNS LIST 100, 200, 300, 400, 500 sensor package
10 FBG sensor
11, 11a, 11b, 11c, and 11d first pressure-sensitive adhesive layer
12 resin portion
13 covering material
14 adhesive layer
15 optical fiber
16 second pressure-sensitive adhesive layer
17 second substrate
18 first release liner
19 second release liner
20 first substrate
30 release liner

The invention claimed is:
1. A sensor package to be attached to an object, the sensor package comprising:
a first substrate;
a Fiber Bragg Grating (FBG) sensor;
a resin portion and a first pressure-sensitive adhesive layer positioned on the first substrate; and
an adhesive layer positioned on a surface of the resin portion on a side opposite to the first substrate, wherein
the FBG sensor is held by the resin portion,
the first pressure-sensitive adhesive layer has an opening portion that penetrates in a thickness direction, and
the resin portion holds the FBG sensor so as to fill a gap between the FBG sensor disposed in the opening portion and the opening portion.

2. The sensor package according to claim 1, wherein the adhesive layer is cured at room temperature.

3. The sensor package according to claim 1, wherein the adhesive layer is cured by a curing agent.

4. The sensor package according to claim 1, wherein at least a part of an entire periphery of the resin portion holding the FBG sensor excluding a surface on the adhesive layer side is covered with the first pressure-sensitive adhesive layer.

5. The sensor package according to claim 1, wherein surfaces of the first pressure-sensitive adhesive layer and the adhesive layer on a side to be attached to the object are protected by a first release liner.

6. The sensor package according to claim 1, wherein the first substrate is transparent or translucent.

7. The sensor package according to claim 1, further comprising:
a second pressure-sensitive adhesive layer and a second substrate in this order on a surface of the first substrate on a side opposite to a surface on the first pressure-sensitive adhesive layer side.

8. The sensor package according to claim 7, wherein the second substrate is a weather resistant substrate.

9. The sensor package according to claim 7, further comprising:
a release liner in a part between the first substrate and the second pressure-sensitive adhesive layer, wherein
the release liner includes an extension portion that extends beyond the second pressure-sensitive adhesive layer and is exposed in a surface spreading direction of the release liner.

10. A method for attaching the sensor package according to claim 1, wherein
the adhesive layer in the sensor package is cured by a curing agent, the method for attaching the sensor package comprising:
a step of applying the curing agent to at least one of the adhesive layer and the object; and
a step of attaching the sensor package to the object via the adhesive layer.

11. A method for attaching the sensor package according to claim 1, wherein
the adhesive layer in the sensor package is cured by a curing agent, the method for attaching the sensor package comprising:
a step of applying the curing agent to the adhesive layer;
a step of applying the curing agent to the object; and
a step of attaching the sensor package to the object so that the curing agent applied to the adhesive layer and the curing agent applied to the object are in contact with each other.

12. A method for attaching the sensor package according to claim 1 in which the sensor package is attached to the object, wherein
in the sensor package, surfaces of the first pressure-sensitive adhesive layer and the adhesive layer on a side to be attached to the object are protected by a first release liner,
the sensor package includes the first substrate, a second pressure-sensitive adhesive layer and a second substrate in this order on a surface of the first pressure-sensitive adhesive layer on a side opposite to a surface on the side to be attached to the object, and
the sensor package includes a second release liner in a part between the first substrate and the second pressure-sensitive adhesive layer, and the second release liner includes an extension portion that extends beyond the second pressure-sensitive adhesive layer and is exposed in a surface spreading direction of the second release liner, the method for attaching the sensor package comprising:
a step of releasing the first release liner and applying a curing agent to the adhesive layer;
a step of attaching a release surface from which the first release liner of the sensor package is released to the object; and
a step of releasing the second release liner and attaching a release surface of the second pressure-sensitive adhesive layer, from which the second release liner is released, to the first substrate.

13. A set comprising:
the sensor package according to claim 1 and a curing agent.

14. A sensor package to be attached to an object, the sensor package comprising:
a first substrate;
a Fiber Bragg Grating (FBG) sensor;
a resin portion and a first pressure-sensitive adhesive layer positioned on the first substrate; and
an adhesive layer positioned on a surface of the resin portion on a side opposite to the first substrate, wherein
the FBG sensor is held by the resin portion, and
surfaces of the first pressure-sensitive adhesive layer and the adhesive layer on a side to be attached to the object are protected by a first release liner.

15. The sensor package according to claim 14, wherein the adhesive layer is cured at room temperature.

16. The sensor package according to claim 14, wherein the adhesive layer is cured by a curing agent.

17. The sensor package according to claim 14, wherein at least a part of an entire periphery of the resin portion holding the FBG sensor excluding a surface on the adhesive layer side is covered with the first pressure-sensitive adhesive layer.

18. A sensor package to be attached to an object, the sensor package comprising:
a first substrate;
a Fiber Bragg Grating (FBG) sensor;
a resin portion and a first pressure-sensitive adhesive layer positioned on the first substrate; and
an adhesive layer positioned on a surface of the resin portion on a side opposite to the first substrate, wherein
the FBG sensor is held by the resin portion, and
the first substrate is transparent or translucent.

19. The sensor package according to claim 18, further comprising:
a second pressure-sensitive adhesive layer and a second substrate in this order on a surface of the first substrate on a side opposite to a surface on the first pressure-sensitive adhesive layer side.

20. The sensor package according to claim 19, further comprising:
a release liner in a part between the first substrate and the second pressure-sensitive adhesive layer, wherein
the release liner includes an extension portion that extends beyond the second pressure-sensitive adhesive layer and is exposed in a surface spreading direction of the release liner.

* * * * *